(12) United States Patent
Tajima et al.

(10) Patent No.: US 10,999,659 B2
(45) Date of Patent: May 4, 2021

(54) OPTICAL NETWORK DEVICE AND METHOD FOR MONITORING TRANSMISSION LINE

(71) Applicant: FUJITSU LIMITED, Kawasaki (JP)

(72) Inventors: Kazuyuki Tajima, Yokosuka (JP); Takahito Tanimura, Yokohama (JP); Setsuo Yoshida, Inagi (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/937,707

(22) Filed: Jul. 24, 2020

(65) Prior Publication Data
US 2021/0092498 A1 Mar. 25, 2021

(30) Foreign Application Priority Data
Sep. 20, 2019 (JP) .............................. JP2019-171241

(51) Int. Cl.
*H04B 10/00* (2013.01)
*H04Q 11/00* (2006.01)

(52) U.S. Cl.
CPC ..... *H04Q 11/0071* (2013.01); *H04Q 11/0005* (2013.01); *H04Q 11/0067* (2013.01);
(Continued)

(58) Field of Classification Search
CPC ............ H04B 10/2507; H04B 10/2572; H04B 10/5053; H04B 10/0775; H04B 10/0795;
(Continued)

(56) References Cited

U.S. PATENT DOCUMENTS

| 5,926,594 A * | 7/1999 | Song ..................... G02B 6/30 385/15 |
| 2013/0004162 A1* | 1/2013 | Osaka ..................... H04J 14/02 398/34 |

(Continued)

FOREIGN PATENT DOCUMENTS

| JP | 2018-133725 A | 8/2018 |
| JP | 2019-009647 A | 1/2019 |

*Primary Examiner* — Hibret A Woldekidan
(74) *Attorney, Agent, or Firm* — Staas & Halsey LLP

(57) ABSTRACT

An optical network device receives an optical signal, to which polarization information is added, from a transmitter via a transmission line. The receiver generates electric-field-information signal of the optical signal. The processor acquires, for respective polarization rotation amounts, the electric-field-information signal during a period specified by the polarization information. The processor calculates, for respective polarization rotation amounts and based on the electric-field-information signal, evaluation values corresponding to powers of the optical signal at a plurality of positions on the transmission line. The processor calculates, for respective positions, variations in the evaluation values corresponding to the polarization rotation amounts. The processor output information that indicates a first position when the variation in the evaluation values for the first position is larger than that for a second position where the second position is adjacent to the first position on a transmitter side.

14 Claims, 24 Drawing Sheets

(52) U.S. Cl.
CPC ............... *H04Q 2011/0035* (2013.01); *H04Q 2011/0083* (2013.01)

(58) Field of Classification Search
CPC .. H04B 2210/078; H04B 10/40; H04B 10/50; H04B 10/60; H04B 10/61; H04B 10/07; H04B 10/0771; H04J 14/06; H04Q 11/0071; H04Q 11/0005; H04Q 11/0067; H04Q 2011/0035; H04Q 2011/0083; G01M 11/31; G01M 11/336
USPC ....... 398/152, 158, 159, 147, 140, 141, 184, 398/202, 205, 65, 37
See application file for complete search history.

(56) References Cited

U.S. PATENT DOCUMENTS

| | | | |
|---|---|---|---|
| 2018/0234184 A1* | 8/2018 | Tanimura | H04B 10/6161 |
| 2018/0375580 A1 | 12/2018 | Tanimura et al. | |
| 2019/0331931 A1* | 10/2019 | Oyama | H04J 14/06 |

* cited by examiner

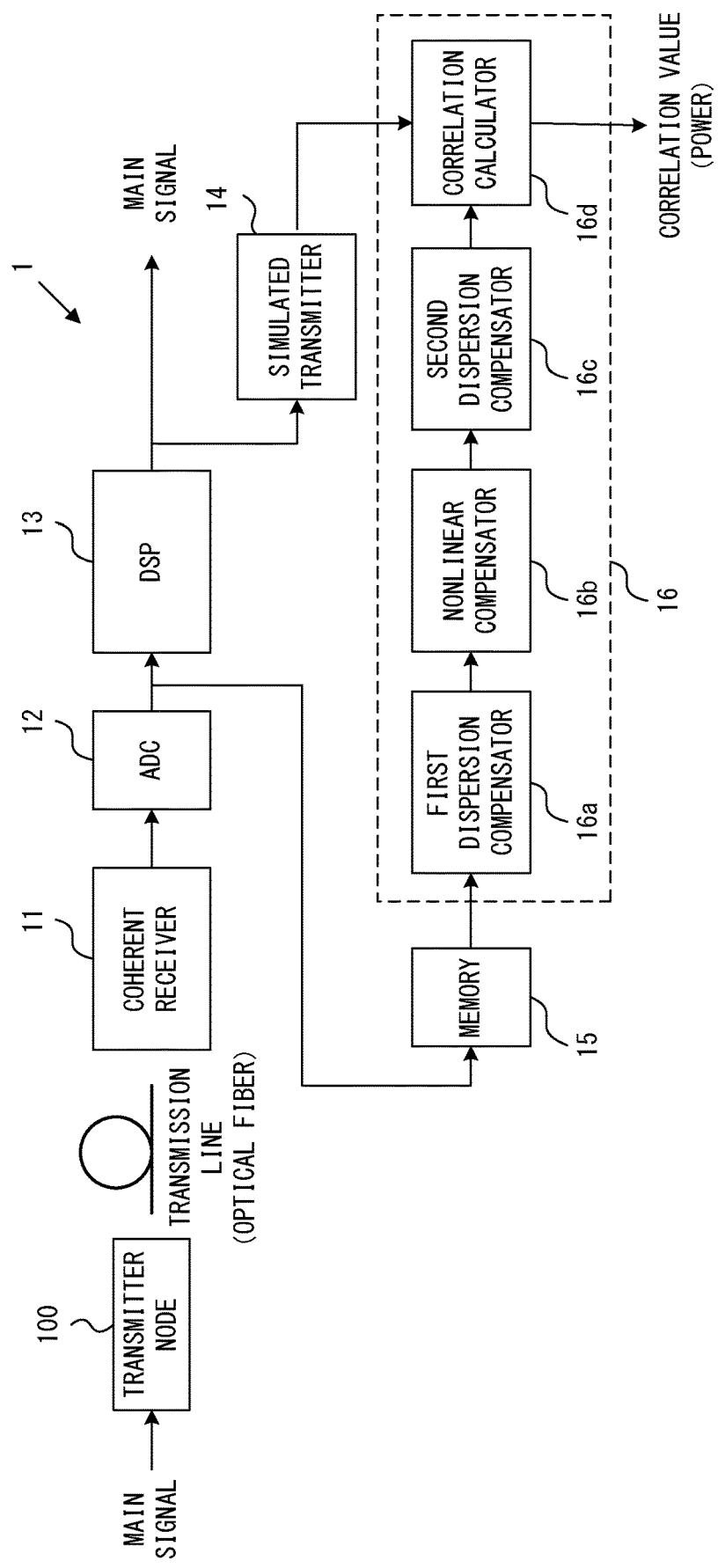
F I G. 1

FIG. 7A
| POLARIZATION INFORMATION | MEANING |
|---|---|
| 0 | POLARIZATION ROTATION AMOUNT IS CHANGING |
| 1 | POLARIZATION ROTATION AMOUNT IS CONSTANT |
FIG. 7B
| POLARIZATION INFORMATION | MEANING |
|---|---|
| 0 | POLARIZATION ROTATION AMOUNT IS CHANGING |
| 1 | POLARIZATION ROTATION AMOUNT IS CONSTANT |
| 2 | START OF MEASUREMENT |
| 3 | END OF MEASUREMENT |
FIG. 7C
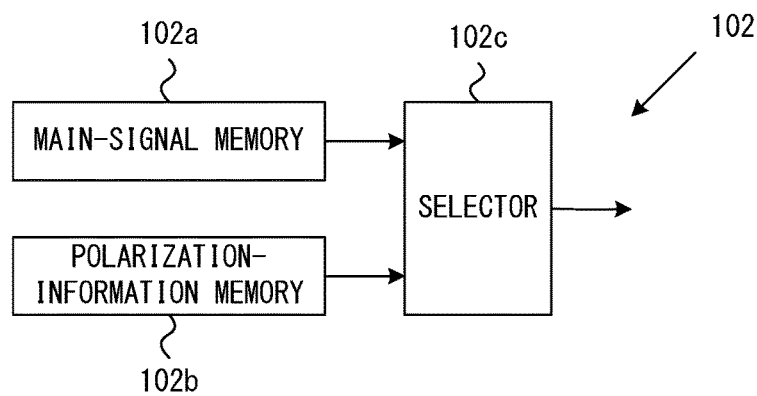
FIG. 7D
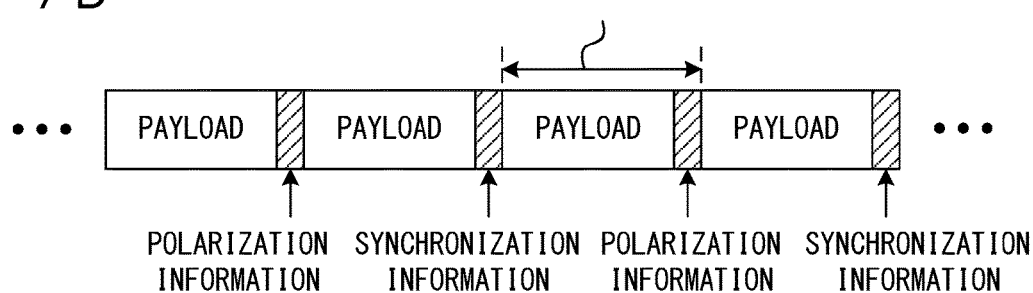

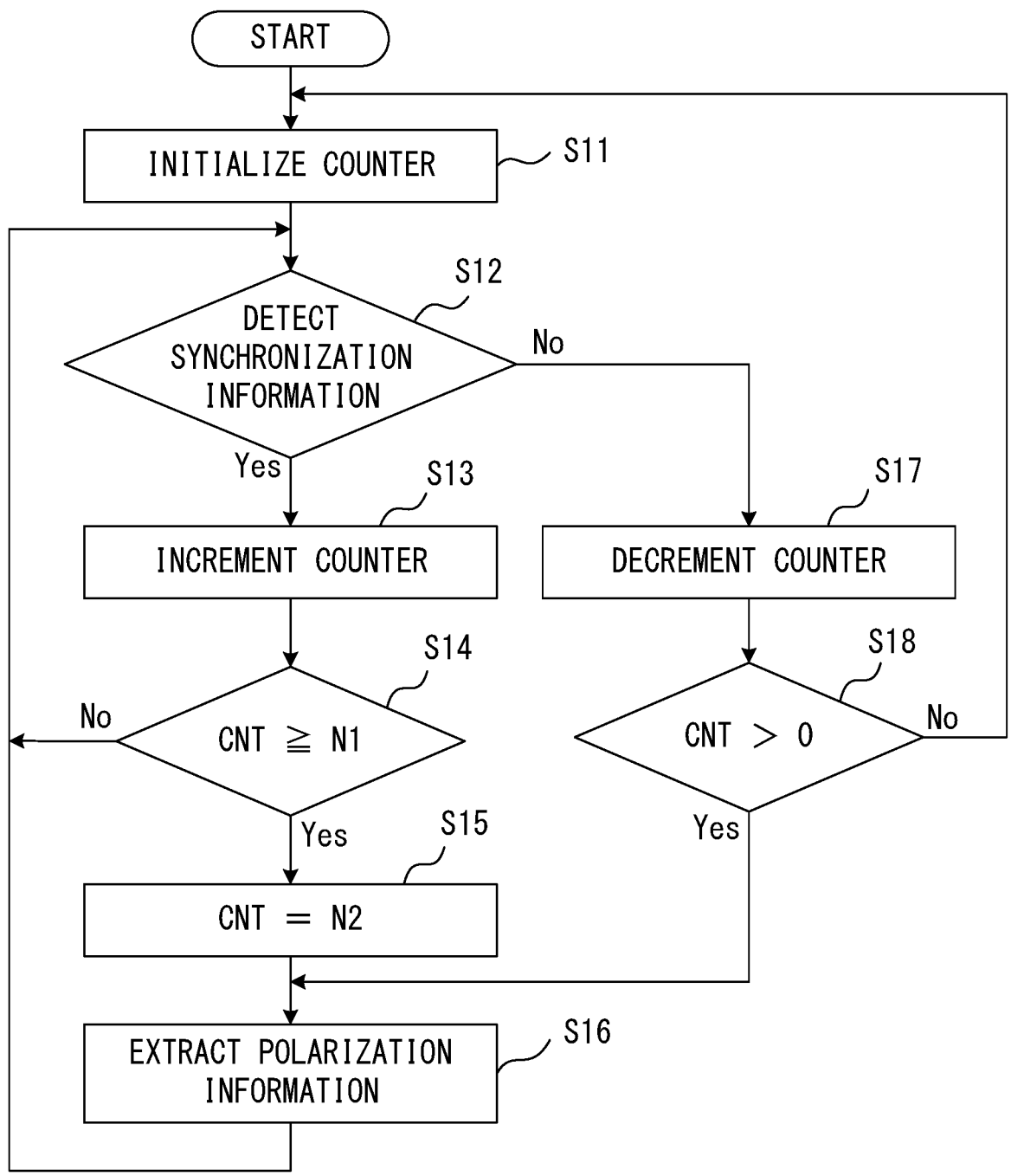
F I G. 10

| MEASUREMENT POSITION | X0 | X1 | X2 | X3 | X4 | X5 |
|---|---|---|---|---|---|---|
| CHROMATIC DISPERSION CD1 | 100 | 80 | 60 | 40 | 20 | 0 |
| CHROMATIC DISPERSION CD2 | 0 | 20 | 40 | 60 | 80 | 100 |
| POLARIZATION ROTATION AMOUNT P1 | C01 | C11 | C21 | C31 | C41 | C51 |
| POLARIZATION ROTATION AMOUNT P2 | C02 | C12 | C22 | C32 | C42 | C52 |
| POLARIZATION ROTATION AMOUNT P3 | C03 | C13 | C23 | C33 | C43 | C53 |
| POLARIZATION ROTATION AMOUNT P4 | C04 | C14 | C24 | C34 | C44 | C54 |
| POLARIZATION ROTATION AMOUNT P5 | C05 | C15 | C25 | C35 | C45 | C55 |

| MEASUREMENT POSITION | X0 | X1 | X2 | X3 | X4 | X5 |
|---|---|---|---|---|---|---|
| POLARIZATION ROTATION AMOUNT P1 | 80 | 70 | 60 | 50 | 40 | 30 |
| POLARIZATION ROTATION AMOUNT P2 | 81 | 70 | 55 | 44 | 35 | 26 |
| POLARIZATION ROTATION AMOUNT P3 | 80 | 71 | 50 | 40 | 31 | 21 |
| POLARIZATION ROTATION AMOUNT P4 | 80 | 71 | 54 | 45 | 35 | 26 |
| POLARIZATION ROTATION AMOUNT P5 | 81 | 69 | 59 | 48 | 39 | 30 |
| DIFFERENCE | 1 | 2 | 10 | 10 | 9 | 9 |

F I G. 1 5

| CYCLE NUMBER | POLARIZATION ROTATION AMOUNT (DEGREES) | | | | | | | | |
|---|---|---|---|---|---|---|---|---|---|
| 1 | 10 | 20 | 30 | 40 | 50 | 60 | 70 | 80 | 90 |
| 2 | 15 | 25 | 35 | 45 | 55 | 65 | 75 | 85 | 95 |
| 3 | 12 | 22 | 32 | 42 | 52 | 62 | 72 | 82 | 92 |
| 4 | 7 | 17 | 27 | 37 | 47 | 57 | 67 | 77 | 87 |

OPTICAL NETWORK DEVICE AND METHOD FOR MONITORING TRANSMISSION LINE

CROSS-REFERENCE TO RELATED APPLICATION

This application is based upon and claims the benefit of priority of the prior Japanese Patent Application No. 2019-171241, filed on Sep. 20, 2019, the entire contents of which are incorporated herein by reference.

FIELD

The embodiments discussed herein are related to an optical network device and a method for monitoring a transmission line.

BACKGROUND

There is a need for optical fiber communications for long-distance transmissions and large-capacity transmissions due to an increase in communication traffic amounts. In the meantime, communications are performed with performance close to the limit of transmission devices, and thus a change in the state of a transmission line may constitute a factor that degrades transmission characteristics. One cause of such degradation of transmission characteristics is a polarization dependent loss (PDL). A PDL is a phenomenon in which an insertion loss differs in accordance with polarizations, and occurs not only in fabricating a device or the like but also occurs during an operation due to a route change in an optical node, reconnection of an optical fiber, a bend in an optical fiber, or the like.

Presence of a PDL results in, for example, a decrease in reception power for any of the polarizations, thereby reducing transmission qualities. Hence, it will be important to detect the state of a PDL during an operation in order to shorten a period in which the performance of a transmission system is decreased.

For example, in measurement of a PDL, test light with a single polarization may be input from a transmitter node to an object to be measured (i.e., an optical fiber transmission line), while changing the angle of the polarization of the test light little by little. Then, a receiver node measures, for each polarization, the power of light output from the object to be measured and calculates the PDL according to the largest value and the smallest value of the measured values.

A proposed device and method are ones wherein the states of sections on a transmission line are monitored (e.g., Japanese Laid-open Patent Publication No. 2018-133725). Other proposed device and method are ones wherein the physical states of points on a transmission line are estimated (e.g., Japanese Laid-open Patent Publication No. 2019-009647).

It is difficult to detect which position on a transmission line a PDL has occurred at using the above-described method (i.e., a method wherein while the angle of the polarization is being changed, the receiver node calculates the PDL from the largest value and the smallest value of optical power). In addition, in this method, dedicated test light for measuring the PDL is inserted into the transmission line, and hence communication services need to be stopped when measuring the PDL.

Tapping optical signals at a plurality of positions on a transmission line so as to monitor optical power may allow for detection of a position at which a PDL has occurred. However, this method will need much effort and time to detect the position at which a PDL has occurred. In particular, considerable effort and time will be needed to search a transmission line having a length of several hundreds of kilometers.

SUMMARY

According to an aspect of the embodiments, an optical network device receives an optical signal via a transmission line. The optical signal is transmitted from a transmitter node. Polarization information that indicates a polarization state is added to the optical signal. The optical network device includes: a receiver configured to generate electric-field-information signal that indicates an electric field of the optical signal; and a processor configured to acquire, when a polarization rotation amount of the optical signal is controlled in the transmitter node, for each of the polarization rotation amounts of the optical signal, the electric-field-information signal during a period specified by the polarization information, calculate, for each of the polarization rotation amounts of the optical signal and based on the electric-field-information signal, evaluation values corresponding to powers of the optical signal at a plurality of positions on the transmission line, calculate, for each of the plurality of positions, variations in the evaluation values corresponding to the polarization rotation amounts of the optical signal, and output information that indicates a first position among the plurality of positions when the variation in the evaluation values for the first position is larger than the variation in the evaluation values for a second position among the plurality of positions, the second position being adjacent to the first position and being located on a side where the transmitter node is provided with respect to the first position.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a method for measuring the power of an optical signal on a transmission line;

FIGS. 7A-7D illustrate examples of the configuration and insertion of polarization information;

FIG. 10 is a flowchart illustrating an example of an operation of a polarization information extractor;

FIG. 15 illustrates another example of a method for detecting a position at which a polarization dependent loss has occurred;

DESCRIPTION OF EMBODIMENTS

Figure 2:
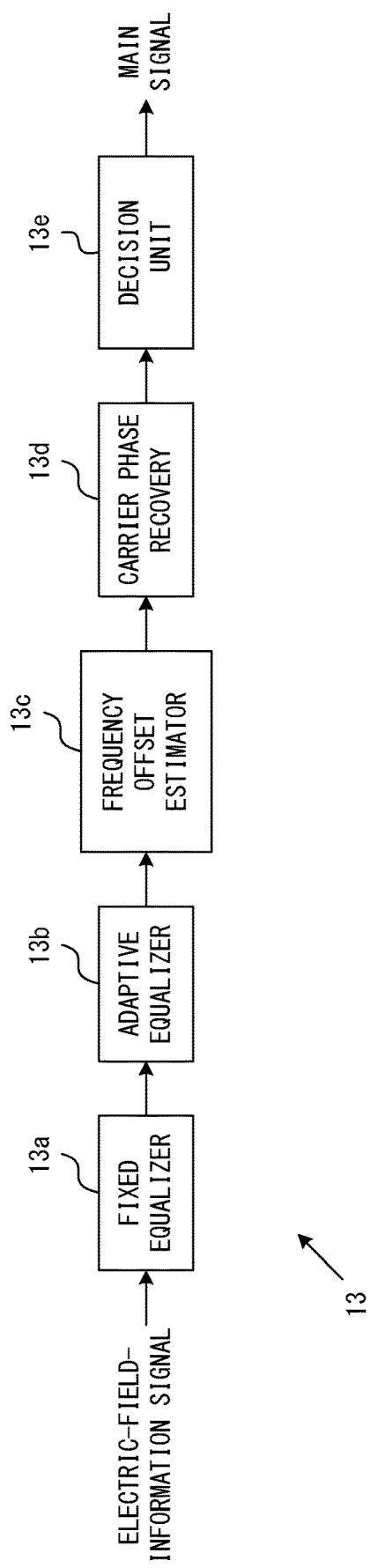
FIG. 2 illustrates an example of a digital signal processor.

An optical network device in accordance with embodiments of the present invention has a function for measuring optical power for an arbitrary position on a transmission line according to a received optical signal and a function for detecting a position at which a polarization dependent loss has occurred by using the result of measurement. Descriptions are given of the function for measuring the power of an optical signal at an arbitrary position on a transmission line before descriptions are given of the function for detecting a position at which a polarization dependent loss has occurred.

FIG. 1 illustrates an example of a method for measuring the power of an optical signal at an arbitrary position on a transmission line. In this example, an optical signal from a transmitter node is transmitted to an optical network device 1 through a transmission line (optical fiber).

The optical network device 1 includes a coherent receiver 11, an analog-to-digital converter (ADC) 12, a digital signal processor (DSP) 13, a simulated transmitter 14, a memory 15, and a characteristics detector 16. The optical network device 1 may include other functions or circuits that are not depicted in FIG. 1.

The coherent receiver 11 includes a 90° optical hybrid circuit and generates an electric-field-information signal indicating the electric field of a received optical signal (or electrical-field data indicating the electrical field of the received optical signal). The electric-field-information signal includes an in-phase (I) component and a quadrature (Q) component of the received optical signal. When the optical signal is a polarization multiplexed optical signal, the electric-field-information signal includes an I component and a Q component of a H polarization and an I component and a Q component of a V polarization. The ADC 12 converts the electric-field-information signal into a digital signal.

As depicted in FIG. 2, the digital signal processor 13 includes a fixed equalizer 13a, an adaptive equalizer 13b, a frequency offset estimator 13c, a carrier phase recovery 13d, and a decision unit 13e. The fixed equalizer 13a compensates for known wavelength-degraded components (e.g., chromatic dispersion of the transmission line). The adaptive equalizer 13b adaptively performs equalization. The adaptive equalizer 13b has a function for separating a polarization when a received optical signal is a polarization multiplexed optical signal. The frequency offset estimator 13c estimates and compensates for a frequency offset between a transmitter node 100 and the optical network device 1. The carrier phase recovery 13d recovers the phase of an optical signal transmitted from the transmitter node 100. Thus, a signal point on a constellation is recovered. The decision unit 13e recovers the bit string of a main signal. The decision unit 13e may be included in the digital signal processor 13 or may be provided on the output side of the digital signal processor 13.

The simulated transmitter 14 generates an electric-field-information signal by mapping a main signal recovered by the digital signal processor 13 (or decision unit 13e) onto a constellation. This mapping is the same as the mapping performed by the transmitter node 100. Thus, the electric-field-information signal generated by the simulated transmitter 14 is substantially the same as an electric-field-information signal for generating an optical signal in the transmitter node 100. Accordingly, an output signal of the simulated transmitter 14 indicates the electric field of the optical signal in the transmitter node 100.

The memory circuit 15 acquires an electric-field-information signal indicating the electric field of a received optical signal and stores the acquired signal in a corresponding memory region. The electric-field-information signal indicates a state before compensation of chromatic dispersion from the transmission line.

The characteristics detector 16 includes a first dispersion compensator 16a, a nonlinear compensator 16b, a second dispersion compensator 16c, and a correlation calculator 16d and compensates for chromatic dispersion and nonlinear distortion in an electric-field-information signal indicating the electric field of a received optical signal. The first dispersion compensator 16a compensates for a portion of a chromatic dispersion (hereinafter, a "first chromatic dispersion") of the transmission line in the electric-field-information signal. The nonlinear compensator 16b compensates for a nonlinear distortion of the transmission line in an output signal of the first dispersion compensator 16a. The second dispersion compensator 16c compensates for the remaining chromatic dispersion (hereinafter, a "second chromatic dispersion) of the transmission line in an output signal of the nonlinear compensator 16b. The correlation calculator 16d calculates a correlation between an output signal of the second dispersion compensator 16c and an output signal of the simulated transmitter 14. The output signal of the simulated transmitter 14 indicates the electric field of the optical signal in the transmitter node 100, as described above. Accordingly, the correlation calculator 16d calculates a correlation between the electric-field-information signal in which the chromatic dispersion and the nonlinear distortion have been compensated for in the characteristics detector 16 and the electric-field-information signal indicating the electric field of the optical signal in the transmitter node 100.

This correlation value indicates the power of the optical signal transmitted through the transmission line. Accordingly, the optical network device 1 can measure the power of the optical signal transmitted through the transmission line by calculating the correlation value. The following describes a relationship between a correlation value and the power of an optical signal by referring to FIG. 3.

Figure 3:
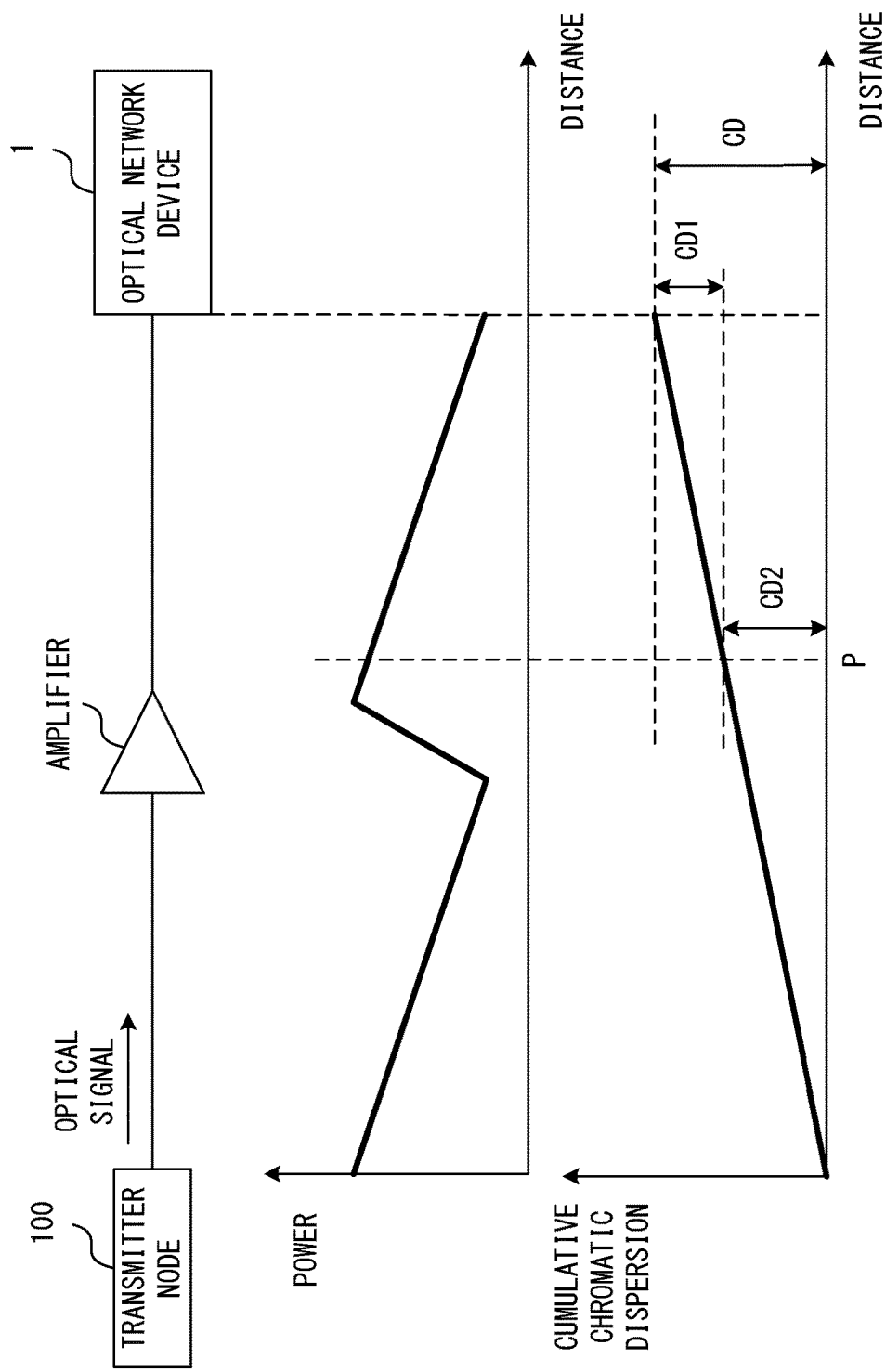
FIG. 3 illustrates an example of changes in the power of an optical signal and in chromatic dispersion in the optical signal.

FIG. 3 illustrates an example of changes in the power of an optical signal and in chromatic dispersion in the optical signal. In this example, an optical signal is transmitted from the transmitter node 100 to the optical network device 1. An optical amplifier is provided on the transmission line.

The power of the optical signal decreases as the distance from the transmitter node 100 increases. The optical signal is amplified by the optical amplifier. Afterward, the power of the optical signal decreases as the distance from the optical amplifier increases. Cumulative chromatic dispersion added to the optical signal increase in proportion to the distance from the transmitter node 100. Note that the "CD" indicated in FIG. 3 represents the total chromatic dispersion in the transmission line between the transmitter node 100 and the optical network device 1.

In this example, the optical network device 1 measures the power of the optical signal at a position P depicted in FIG. 3. Note that the chromatic dispersion in the transmission line between the optical network device 1 and the position P is CD1. The chromatic dispersion between the position P and the transmitter node 100 is CD2. The sum of CD1 and CD2 is CD.

In this case, the first dispersion compensator 16a compensates for the chromatic dispersion CD1 in an electric-field-information signal indicating the received optical signal. The nonlinear compensator 16b compensates for the nonlinear distortion in an output signal of the first dispersion compensator 16a. The second dispersion compensator 16c compensates for the chromatic dispersion CD2 an output signal of the nonlinear compensator 16b. In this case, the nonlinear compensator 16b performs a specified amount of nonlinear compensation, and the correlation calculator 16d obtains a correlation between the output of the second dispersion compensator 16c and an electric-field-information signal indicating the electric field of the optical signal in the transmitter node 100, thereby investigating the effect of the nonlinear compensation.

The correlation value calculated by the correction calculator 16d indicates the correlation between the electric-field-information signal in which the chromatic dispersion and the nonlinear distortion have been compensated for in the characteristics detector 16 and the electric-field-information signal indicating the electric field of the optical signal in the transmitter node 100. For example, when the amount of nonlinear distortion at the position P depicted in FIG. 3 is large, the characteristics detector 16 may compensate for a large amount of nonlinear distortion, resulting in a large correlation value. In other words, the correlation value calculated by the correlation calculator 16d corresponds to the amount of nonlinear distortion at the position P.

Meanwhile, the amount of nonlinear distortion is dependent on the power of an optical signal. In particular, the amount of nonlinear distortion increases as the power of the optical signal becomes larger. Thus, in the example depicted in FIG. 3, when the power of the optical signal at the position P is large, the amount of nonlinear distortion at the position P will be large, and the value calculated by the correlation calculator 16d will be large. By contrast, when the power of the optical signal at the position P is small, the amount of nonlinear distortion at the position P will be small, and the value calculated by the correlation calculator 16d will not be large. Thus, the correlation value calculated in the characteristics detector 16 substantially indicates the power of an optical signal at a specified position on the transmission line (position P in FIG. 3). Accordingly, the correlation value is an example of an evaluation value that corresponds to the power of the optical signal on the transmission line.

The position P indicated in FIG. 3 is specified by a combination of the chromatic dispersion CD1 and the chromatic dispersion CD2. Thus, for the electric-field-information signal indicating the received optical signal, the characteristics detector 16 can measure the power of the optical signal at a desired position on the transmission line by changing the combination of the chromatic dispersion CD1 and the chromatic dispersion CD2.

Figure 4:
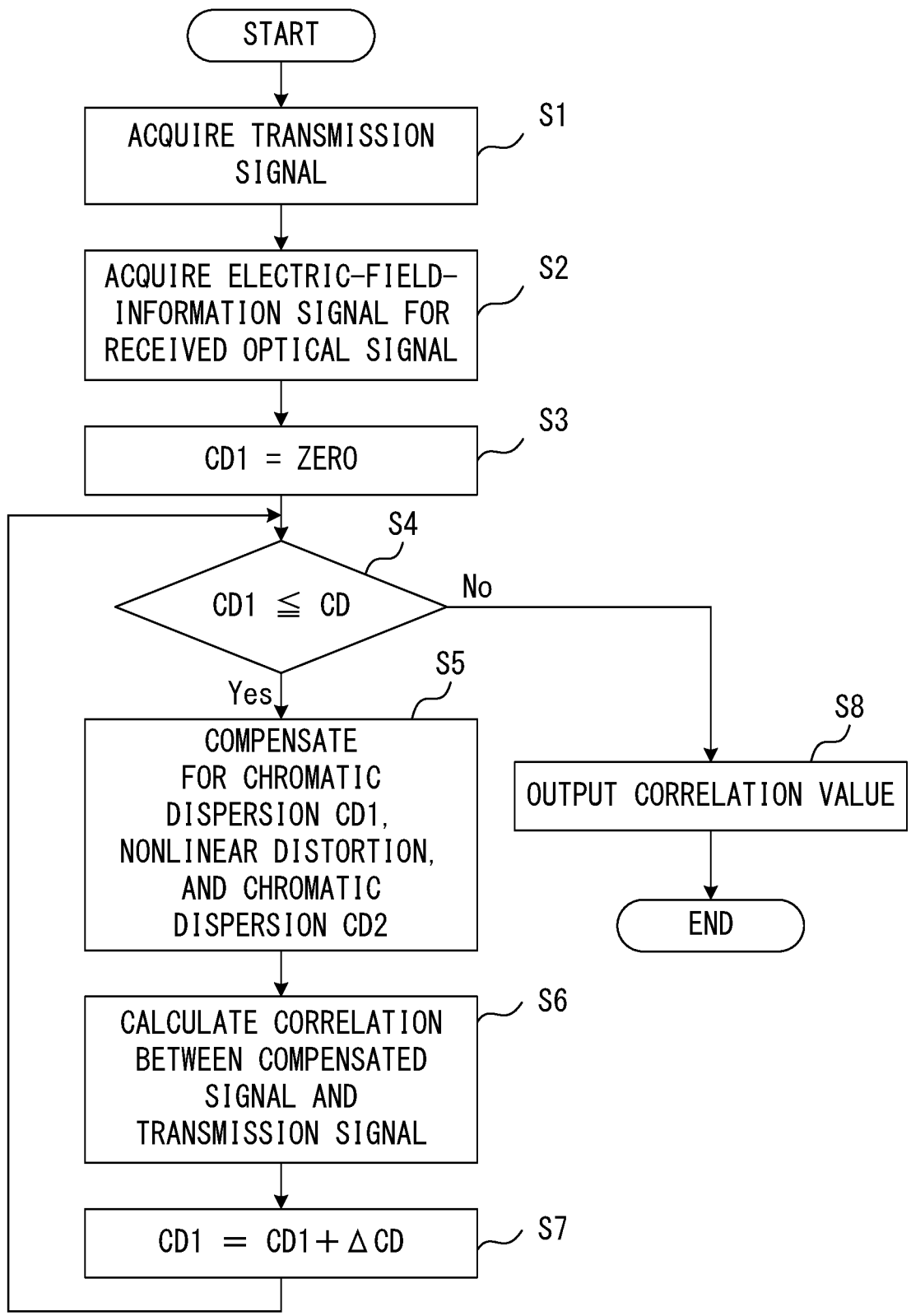
FIG. 4 is a flowchart illustrating an example of a process of measuring the power of an optical signal at a plurality of positions on a transmission line.

FIG. 4 is a flowchart illustrating an example of a process of measuring the power of an optical signal at a plurality of positions on a transmission line. This process is performed when the optical network device 1 receives, via the transmission line, an optical signal transmitted from the transmitter node 100.

In S1, the characteristics detector 16 acquires a transmission signal generated by the simulated transmitter 14. This transmission signal corresponds to an electric-field-information signal indicating the electric field of an optical signal in the transmitter node 100. In S2, the characteristics detector 16 acquires the electric-field-information signal for the received optical signal. This electric-field-information signal is acquired and stored in a corresponding memory region by the memory circuit 15 depicted in FIG. 1.

In S3, the characteristics detector 16 initializes and sets the chromatic dispersion CD1 to "zero". The value of chromatic dispersion CD1 corresponds to a transmission distance with respect to the optical network device 1. The chromatic dispersion CD2 is calculated according to "CD1+CD2=CD". CD represents the total chromatic dispersion in the transmission line between the transmitter node 100 and the optical network device 1. In S4, the characteristics detector 16 decides whether the chromatic dispersion CD1 is less than or equal to CD. When the chromatic dispersion CD1 is less than or equal to CD, the process of the characteristics detector 16 shifts to S5.

In S5, for the electric-field-information signal for the received optical signal, the characteristics detector 16 sequentially performs compensation of the chromatic dispersion CD1, nonlinear compensation, and compensation of the chromatic dispersion CD2. In S6, the characteristics detector 16 calculates a correlation between the electric-field-information signal compensated in S6 and the transmission signal acquired in S1.

In S7, the characteristics detector 16 increases the chromatic dispersion CD1 by ΔCD. Subsequently, the process of the characteristics detector 16 returns to S4. In particular, the characteristics detector 16 calculates correlation values by repeatedly performing S4-S7 until the chromatic dispersion CD1 becomes larger than CD, with the chromatic dispersion CD1 increased by ΔCD in each of the repetitions. The value of chromatic dispersion CD1 corresponds to the transmission distance with respect to the optical network device 1. Thus, the process of increasing the chromatic dispersion CD1 in increments of ΔCD is equivalent to a process of shifting a position on the transmission line by a distance that corresponds to ΔCD. Accordingly, the characteristics detector 16 calculates correlation values for a plurality of positions on the transmission line by repeatedly performing the processes of S4-S7.

When the chromatic dispersion CD1 becomes larger than CD, the characteristics detector 16 outputs the correlation values calculated in S4-S7. The correlation values substantially indicate the powers of the optical signal at specified positions on the transmission line, which correspond to combinations of the chromatic dispersions CD1 and CD2. Accordingly, the characteristics detector 16 outputs information indicating the powers of the optical signal at a plurality of positions on the transmission line.

As described above, the optical network device 1 can measure the power of an optical signal at a desired position on the transmission line. Using this function, the optical network device 1 estimates a polarization dependent loss at a desired position on the transmission line.

Figure 5:
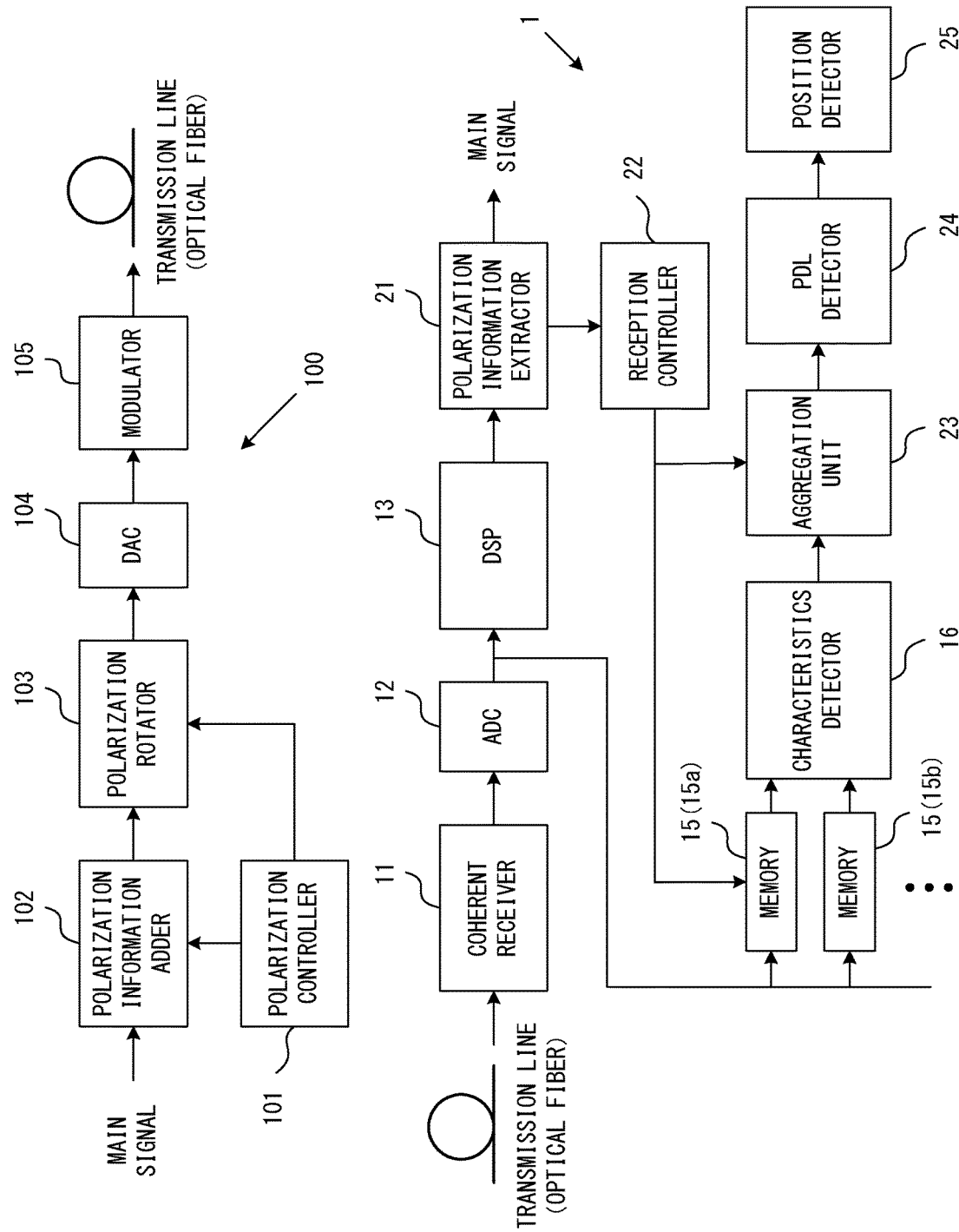
FIG. 5 illustrates an example of an optical network system.

FIG. 5 illustrates an example of an optical network system in accordance with embodiments of the present invention. The optical network system includes the transmitter node 100 and the optical network device 1. The transmitter node 100 and the optical network device 1 are connected by a transmission line. One or more optical amplifiers may be provided on the transmission line. An optical signal transmitted from the transmitter node 100 propagates through the transmission line and is received by the optical network device 1.

The transmitter node 100 includes a polarization controller 101, a polarization information adder 102, a polarization rotator 103, a digital-to-analog converter (DAC) 104, and a modulator 105. The transmitter node 100 may include other circuits or functions that are not depicted in FIG. 5.

The polarization controller 101 controls the polarization of an optical signal to be transmitted from the transmitter node 100. In particular, the polarization controller 101 changes a polarization rotation amount little by little. For example, the polarization rotation amount may be changed in increments of 10 degrees from zero degrees to 90 degrees. When the polarization rotation amount has reached a target value, the polarization controller 101 maintains this polarization rotation amount for a certain period. For example, when the polarization rotation amount reaches a target value P1 at a time T1 depicted in FIG. 6, the polarization rotation amount may be maintained at the target value P1 for the period from T1 to T2. Afterward, the polarization controller 101 slowly increases the polarization rotation amount. When the polarization rotation amount reaches a target value P2 at a time T3, the polarization rotation amount is maintained at the target value P2 for the period from T3 to T4. As will be described hereinafter, the optical network device 1 estimates a polarization dependent loss in the transmission line by acquiring the electric field information of a received optical signal during a period in which the polarization rotation amount of the optical signal is maintained at a constant value.

The polarization controller 101 generates polarization information. The polarization information is used to report the control state in the transmitter node 100 to a receiver node (optical network device 1 in FIG. 5). For example, the polarization information may indicate whether the polarization rotation amount is constant, as depicted in FIG. 7A. In this example, "1" indicates that the polarization rotation amount is constant. "0" indicates that the polarization rotation amount is not constant. In particular, "0" indicates that the polarization rotation amount is changing from one value to another. Note that polarization information may be expressed by one bit in the case depicted in FIG. 7A.

Polarization information is not limited to the configuration depicted in FIG. 7A. For example, polarization information may include information indicating start or end of measurement, as depicted in FIG. 7B. In this example, "2" indicates start of measurement, and "3" indicates end of measurement.

The polarization information adder 102 adds polarization information to a main signal. For example, when a frame storing a main signal is transmitted, polarization information may be inserted into a specified region in the header of the frame. In this case, the polarization information adder 102 includes a main-signal memory 102a, a polarization-information memory 102b, and a selector 102c, as depicted in FIG. 7C. A main signal is stored in the main-signal memory 102a, and polarization information is stored in the polarization-information memory 102b. The main signal stored in the main-signal memory 102a and the polarization information stored in the polarization-information memory 102b are each represented by electric field information corresponding to a specified modulation scheme. The selector 102c reads a signal from the main-signal memory 102a or the polarization-information memory 102b so as to insert polarization information into a specified region within the header of a frame.

Polarization information may be inserted into the header of each frame or may inserted at specified interval. For example, polarization information may be inserted for every two frames. In this case, polarization information and synchronization information are inserted in an alternating pattern, as depicted in FIG. 7D. For example, the value of synchronization information may cyclically change within a specified numerical range (0→1→2→3→0 . . . ).

Figure 6:
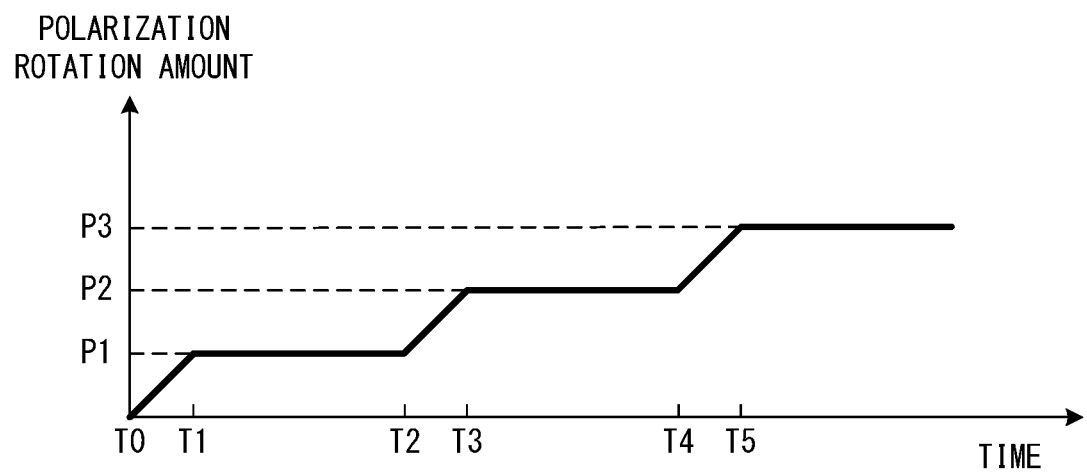
FIG. 6 illustrates an example of the setting of a polarization rotation amount.
Figure 8A:
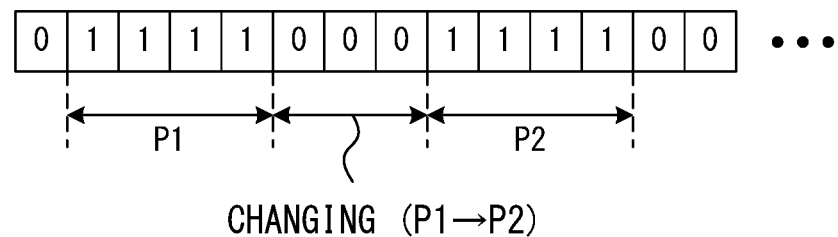
FIGS. 8A and 8B illustrate examples of polarization information.
Figure 8B:
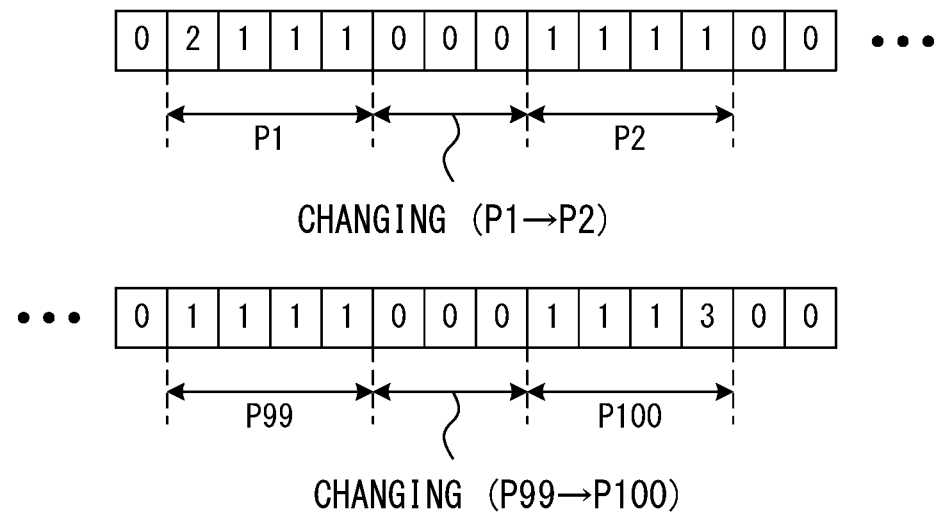

FIGS. 8A and 8B illustrate examples of polarization information. In these examples, the polarization controller 101 increases a polarization rotation amount in stages, as depicted in FIG. 6. Rectangles depicted in FIGS. 8A and 8B each indicate one frame. The number seen in each rectangle indicates the value of polarization information.

FIG. 8A depicts a case in which the polarization information indicated in FIG. 7A is inserted into each frame. The polarization rotation amount is maintained at P1 during the period from T1 to T2 depicted in FIG. 6. Thus, "1" is inserted as polarization information into the headers of the frames transmitted during the period from T1 to T2. Then, the polarization rotation amount slowly changes from P1 to P2 during the period from T2 to T3. Thus, "0" is inserted as polarization information into the headers of the frames transmitted during the period from T2 to T3. In addition, the polarization rotation amount is maintained at P2 during the period from T3 to T4. Thus, "1" is inserted as polarization information into the headers of the frames transmitted during the period from T3 to T4.

FIG. 8B depicts a case in which the polarization information indicated in FIG. 7B is inserted into each frame. In this case, "2" is set as polarization information when starting measurement. "3" is set as polarization information when ending measurement. In this example, the polarization rotation amount is changed in stages from P1 to P100.

The polarization controller 103 controls the polarization of an optical signal in accordance with an instruction from the polarization controller 101. However, the polarization rotator 103 does not directly control the polarization of the optical signal but controls the polarization of the optical signal by correcting an electric-field-information signal for generating the optical signal. In this case, the polarization rotation is implemented by, for example, multiplying a Jones matrix by an electric-field-information signal indicating the main signal.

The Jones matrix for implementing the polarization rotation is expressed by formula 1 and/or formula 2.

$$\begin{pmatrix} \cos\theta & -\sin\theta \\ \sin\theta & \cos\theta \end{pmatrix} \quad (1)$$

$$\begin{pmatrix} e^{-j\frac{\delta}{2}} & 0 \\ 0 & e^{j\frac{\delta}{2}} \end{pmatrix} \quad (2)$$

The polarization of a signal including a X polarization signal and a Y polarization signal is controlled in accordance with formula 1. The difference between the phase of the X polarization signal and the phase of the Y polarization signal is controlled in accordance with formula (2). The polarization rotation is expressed by a combination of θ in formula 1 and δ in formula (2). Thus, adjusting both θ and δ to constant values maintains the polarization rotation amount at a constant value. However, a polarization rotation may be expressed using θ in formula 1 for ease of descriptions hereinafter.

Figure 9:
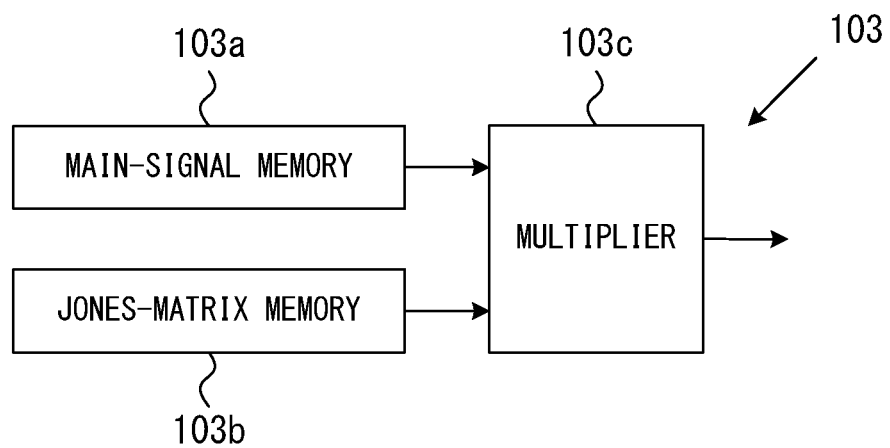
FIG. 9 illustrates an example of a polarization rotator.

For example, the polarization rotator 103 may include a main-signal memory 103a, a Jones-matrix memory 103b, and a multiplier 103c, as depicted in FIG. 9. A main signal is written to the main-signal memory 102a, and a parameter indicating the Jones matrix is stored in the Jones-matrix memory 103b. The multiplier 103c multiplies the Jones matrix by electric field information indicating a main signal. For example, when a polarization rotation is expressed by formula 1, the multiplier 103c may perform a matrix operation of formula 3. Note that Ex_in and Ey_in in formula 3 indicate electric field information input to the polarization rotator 103. Ex_out and Ey_out indicate electric field information output from the polarization rotator 103.

$$\begin{pmatrix} Ex\_out \\ Ey\_out \end{pmatrix} = \begin{pmatrix} \cos\theta & -\sin\theta \\ \sin\theta & \cos\theta \end{pmatrix} \begin{pmatrix} Ex\_in \\ Ey\_in \end{pmatrix} \quad (3)$$

For example, the polarization controller 101, the polarization information adder 102, and the polarization rotator 103 may be implemented by a processor. In particular, in the transmitter node 100, a processor may execute a program to implement the functions of the polarization controller 101, the polarization information adder 102, and the polarization rotator 103.

The DAC 104 converts an output signal of the polarization rotator 103 into an analog signal. The output signal of the polarization rotator 103 includes polarization information. The modulator 105 generates a modulated optical signal based on an output signal of the DAC 104. In this case, for example, the modulator 105 may generate a modulated optical signal by modulating continuous wave light with the output signal of the DAC 104. The polarization of the optical signal in this example is controlled by the polarization controller 101. Thus, the polarization of an optical signal to be transmitted from the transmitter node 100 is controlled by the polarization controller 101 in a manner such as that depicted in FIG. 6. In the meantime, polarization information is added to an optical signal transmitted from the transmitter node 100, as indicated in FIGS. 7A-7D.

An optical signal transmitted from the transmitter node 100 propagates through the transmission line. The optical network device 1 receives the optical signal via the transmission line.

As depicted in FIG. 5, the optical network device 1 includes a coherent receiver 11, an ADC 12, a digital signal processor 13, a memory circuit 15, a characteristics detector 16, a polarization information extractor 21, a reception controller 22, an aggregation unit 23, a PDL detector 24, and a position detector 25. Indications of some components are omitted in FIG. 5 to facilitate visualization. For example, the optical network device 1 in the configuration depicted in FIG. 5 includes the simulated transmitter 14 illustrated in FIG. 1. The optical network device 1 may include other functions or circuits that are not depicted in FIG. 5.

The coherent receiver 11, ADC 12, and digital signal processor 13 depicted in FIG. 5 are substantially the same as those in FIG. 1. Thus, the digital signal processor 13 recovers a main signal according to an electric-field-information signal indicating the electric field of a received optical signal. Note that polarization information has been added to the main signal by the transmitter node 100.

The polarization information extractor 21 acquires the polarization information from the main signal. In this example, the polarization information has been inserted into a specified region in the header of a frame. Accordingly, the polarization information extractor 21 extracts the polarization information from the header of the frame after recovery.

FIG. 10 is a flowchart illustrating an example of an operation of the polarization information extractor 21. In this example, synchronization information and polarization information are inserted into a header of each frame transmitted from the transmitter node 100 to the optical network device 1.

In S11, the polarization information extractor 21 initializes and sets a counter to "zero". The counter counts the number of frames that include synchronization information. In S12, the polarization information extractor 21 decides whether correct synchronization information has been detected from a received frame. When correct synchronization information is detected, the polarization information extractor 21 increments the counter in S13. In S14, the polarization information extractor 21 decides whether a count value CNT is larger than or equal to a specified threshold N1. When the count value CNT is smaller than the threshold N1, the process of the polarization information extractor 21 returns to S12. When the count value CNT is larger than or equal to the threshold N1, the process of the polarization information extractor 21 shifts to S15. In particular, when N1 frames that include correct synchronization information are received, the process of the polarization information extractor 21 shifts to S15.

In S15, the polarization information extractor 21 sets a specified number N2 for the counter. In S16, the polarization information extractor 21 extracts polarization information from a recovered main signal. In particular, after frame synchronization is established, the polarization information extractor 21 extracts polarization information from a main signal.

When correct synchronization information is not detected (S12: No), the polarization information extractor 21 decrements the counter in S17. In S18, the polarization information extractor 21 decides whether the count value CNT is larger than zero. When the count value CNT is larger than zero, the process of the polarization information extractor 21 shifts to S16. Accordingly, once frame synchronization is established, even when a frame including correct synchronization information is not detected, the polarization information extractor 21 extracts polarization information until the count value CNT becomes zero. When the count value CNT becomes smaller than or equal to zero, the process of the polarization information extractor 21 returns to S11.

The reception controller 22 controls a reception process according to polarization information extracted from a main signal. In particular, when polarization information indicates "0 (changing)", the reception controller 22 gives the memory circuit 15 an indication that an electric-field-information signal indicating the electric field of a received optical signal is not to be stored. When polarization information indicates "1 (constant)", the reception controller 22 gives the memory circuit 15 an indication that the electric-field-information signal is to be stored.

The memory circuit 15 stores an electric-field-information signal indicating the electric field of a received optical signal. The memory circuit 15 includes a plurality of memory regions (15*a*, 15*b* . . . ). Each memory region is assigned for a polarization rotation amount controlled by the transmitter node 100. For example, when the polarization rotation amount is controlled as depicted in FIG. 6, a memory region may be assigned for each of P1, P2, P3 . . . . The memory circuit 15 stores the electric-field-information signal in accordance with an instruction from the reception controller 22.

Figure 11:
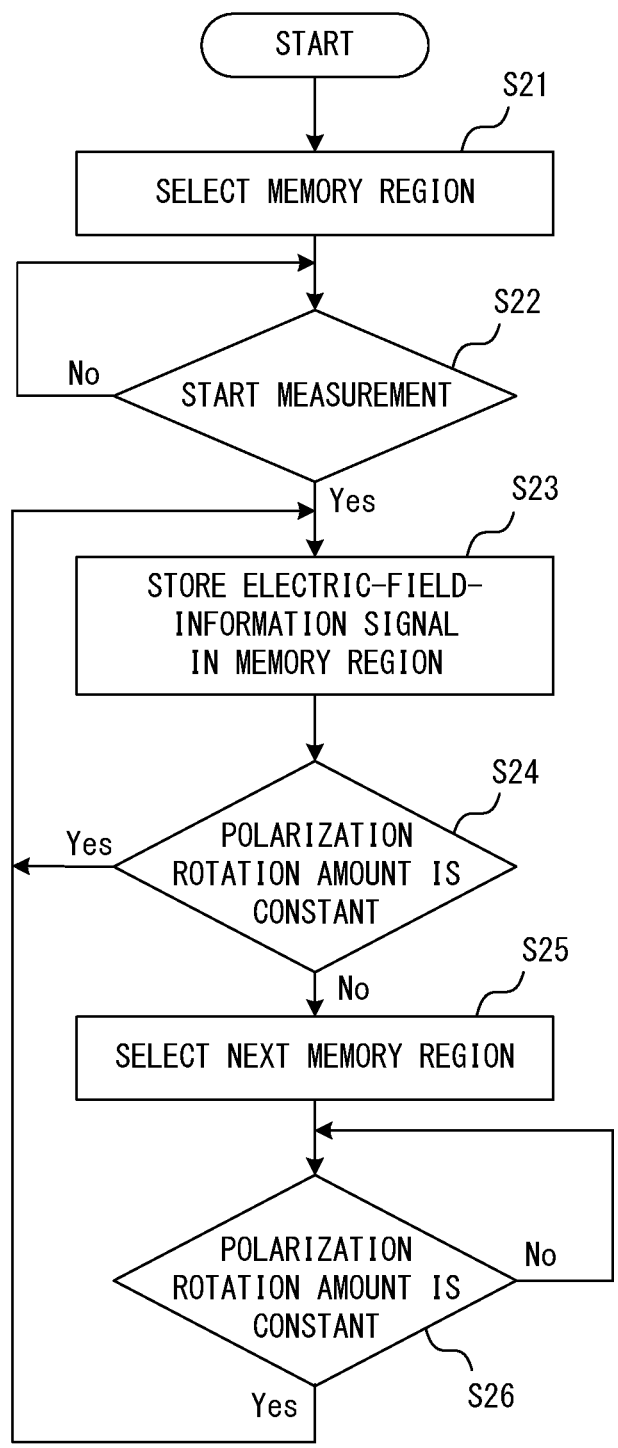
FIG. 11 is a flowchart illustrating an example of a method for storing an electric-field-information signal according to polarization information.

FIG. 11 is a flowchart illustrating an example of a method for storing an electric-field-information signal according to polarization information. The process of this flowchart is performed after the above-described frame synchronization is established. The memory circuit 15 has a function for selecting a memory region in which a signal is to be stored from a plurality of memory regions and a function for writing the signal to the selected memory region.

In S21, the memory circuit 15 selects a memory region in which an electric-field-information signal is to be stored. In S22, the reception controller 22 monitors a trigger indicating start of measurement. For example, in a configuration using the polarization information depicted in FIG. 7A, the reception controller 22 may detect a trigger indicating start of measurement when the value of polarization information changes from 0 to 1 for the first time after frame synchronization is established. In a configuration using the polarization information depicted in FIG. 7B, the reception controller 22 detects a trigger indicating start of measurement when "polarization information: 2" is received. When a trigger indicating start of measurement is detected, the process of the reception controller 22 and the memory circuit 15 shifts to S23.

In S23-S24, the reception controller 22 decides whether a polarization rotation amount is constant according to polarization information. In this case, when "polarization information: 1" is received, the reception controller 22 determines that the polarization rotation amount is constant. When the polarization rotation amount is constant, the memory circuit 15 stores the electric-field-information signal indicating the received optical signal in the selected memory region.

When the polarization rotation amount is not constant, the memory circuit 15 does not store the electric-field-information signal indicating the received optical signal. In particular, when "polarization information: 0" is received, the reception controller 22 determines that the polarization rotation amount is being changed by the transmitter node 100. In this case, the memory circuit 15 stops the writing to the memory region.

In S25, the memory circuit 15 selects a next memory region. In S26, the reception controller 22 decides whether the polarization rotation amount is constant in the transmitter node 100 according to polarization information. In this case, when "polarization information: 1" is received, the reception controller 22 determines that the polarization rotation amount is constant. When the polarization rotation amount is maintained at a constant value, the process of the reception controller 22 and the memory circuit 15 returns to S23. Thus, the electric-field-information signal indicating the received optical signal is stored in the new memory region.

As described above, the optical network device 1 can acquire polarization information to decide whether the polarization rotation amount has been maintained at a constant value in the transmitter node 100. The optical network device 1 stores an electric-field-information signal indicating a received optical signal in a memory region only when the polarization rotation amount is maintained at a constant value in the transmitter node 100. Thus, the optical network device 1 can collect correct electric field information for individual polarization rotation amounts (P1, P2 . . . ).

The optical network device 1 ends the collecting of electric field information upon acquiring electric field information for all the polarization rotation amounts. In a configuration using the polarization information depicted in FIG. 7B, the optical network device 1 ends the collecting of electric field information upon receiving "polarization information: 3".

The characteristics detector 16 in FIG. 5 is substantially the same as that in FIG. 1. Accordingly, the characteristics detector 16 calculates a correlation between an electric-field-information signal in which the chromatic dispersion and the nonlinear distortion have been compensated for in the characteristics detector 16 and an electric-field-information signal indicating the electric field of an optical signal in the transmitter node 100. In this case, the characteristics detector 16 calculates a correlation value while changing a combination of the chromatic dispersions CD1 and CD2. The combination of the chromatic dispersions CD1 and CD2 corresponds to a transmission distance from the transmitter node 100 or the optical network device 1 to a measurement point. In particular, the combination of the chromatic dispersions CD1 and CD2 corresponds to a position on the transmission line. Accordingly, the characteristics detector 16 calculates correlation values for a plurality of different positions on the transmission line. When the transmitter node 100 changes the polarization rotation amount, the characteristics detector 16 calculates correlation values for individual polarization rotation amounts. Note that electric-field-information signals that correspond to the polarization rotation amounts P1, P2 . . . are respectively stored in memory regions 15*a*, 15*b* . . . . In this way, the characteristics detector 16 calculates, for the different polarization rotation amounts, correlation values corresponding to a plurality of different positions on the transmission line.

For each combination of the chromatic dispersions CD1 and CD2, the aggregation unit 23 gathers the correlation values calculated by the characteristics detector 16. Thus, correlation values are gathered for a plurality of different positions on the transmission line. The aggregation unit 23 may gather the correlation values by using polarization information extracted from a received optical signal.

The PDL detector 24 decides whether a polarization dependent loss has occurred on the transmission line by using the correlation values gathered by the aggregation unit 23. When a polarization dependent loss has occurred on the transmission line, the position detector 25 detects a position on the transmission line at which the polarization dependent loss has occurred.

Figure 12:
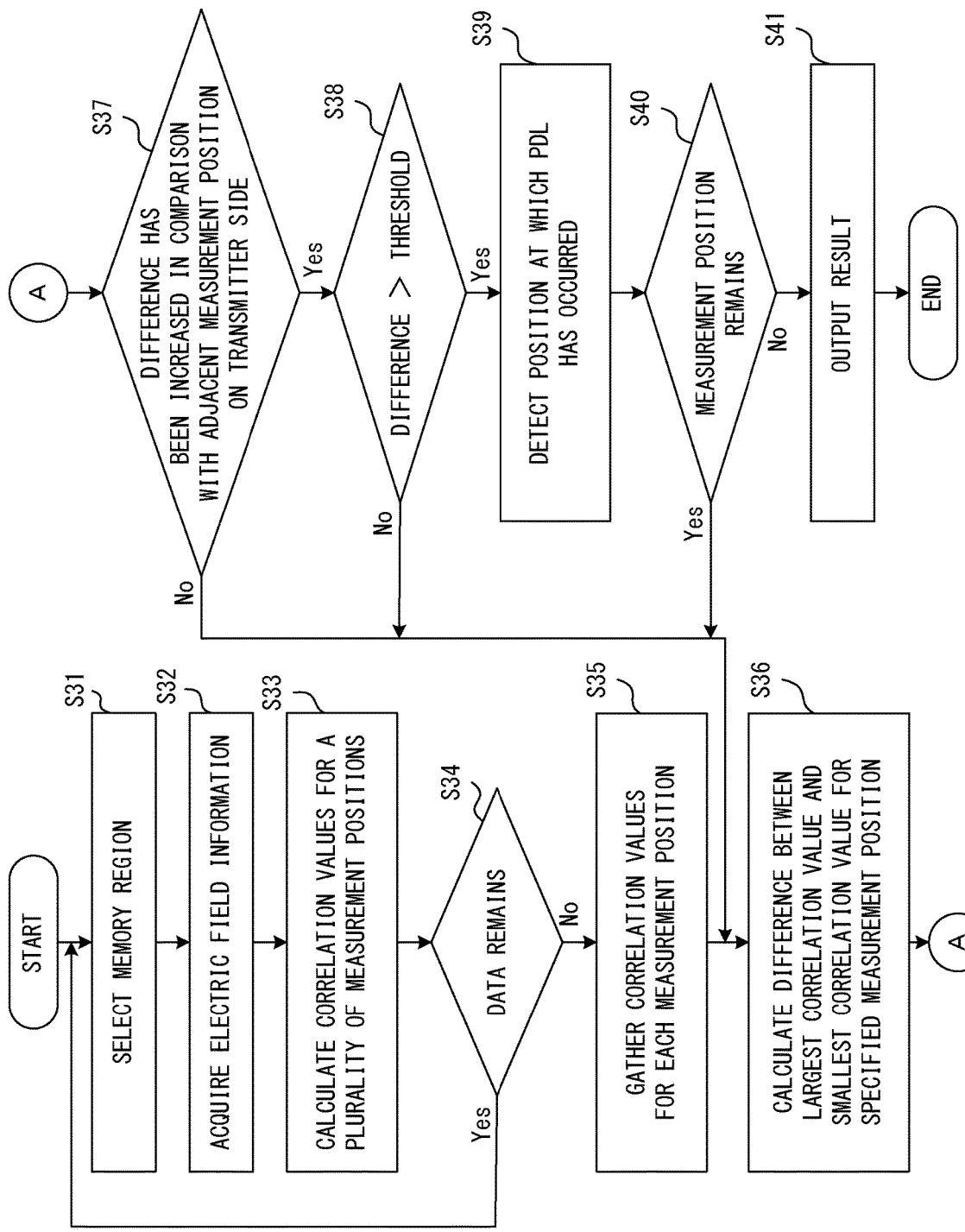
FIG. 12 is a flowchart illustrating an example of a method for detecting a position of occurrence of a polarization dependent loss.

FIG. 12 is a flowchart illustrating an example of a method for detecting a position of occurrence of a polarization dependent loss according to an electric-field-information signal. The process of this flowchart is performed by the characteristics detector 16, the aggregation unit 23, the PDL detector 24, and the position detector 25. Electric-field-information signals that correspond to polarization rotation amounts (P1, P2 . . . ) are respectively stored in memory regions (15a, 15b . . . ).

In S31-S32, the characteristics detector 16 selects one memory region from a plurality of memory regions in the memory 15. The characteristics detector 16 acquires an electric-field-information signal stored in the selected memory region. That is, the characteristics detector 16 acquires an electric-field-information signal that corresponds to a certain polarization rotation amount.

In S33, the characteristics detector 16 calculates correlation values for acquired electric-field-information signals while changing a combination of chromatic dispersions CD1 and CD2. In particular, the characteristics detector 16 calculates correlation values for acquired electric-field-information signals for a plurality of different positions on the transmission line.

Figures 13A, 13B:
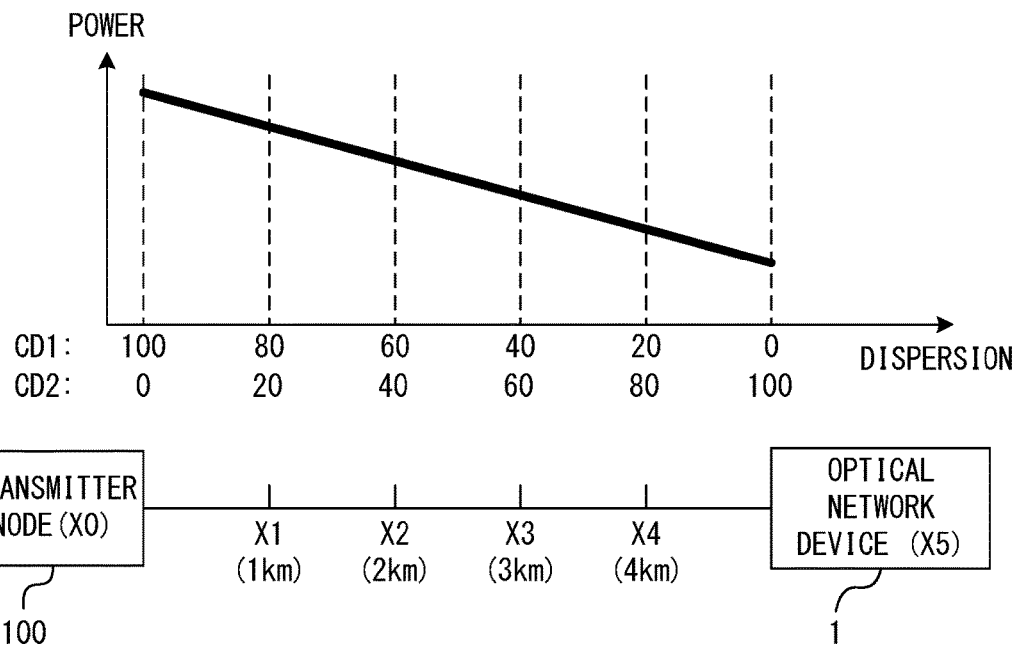
FIGS. 13A and 13B illustrate an example of a method for calculating correlation values for individual polarization rotation amounts.

Assume, for example, that the transmitter node 100 and the optical network device 1 are connected by an optical fiber having a length of 5 km, as depicted in FIG. 13A. The optical fiber has a chromatic dispersion of 20 ps/nm/km. Accordingly, the total chromatic dispersion in the transmission line between the transmitter node 100 and the optical network device 1 is 100 ps/nm.

The characteristics detector 16 calculates correlation values for positions at distances of 0 km (i.e., transmission end), 1 km, 2 km, 3 km, 4 km, and 5 km (i.e., reception end) with respect to the transmitter node 100. Each position on the transmission line is expressed by a combination of chromatic dispersions CD1 and CD2. For example, a position at a distance of 1 km from the transmitter node 100 toward the optical network device 1 may be expressed as "CD1=80, CD2=20". A position at a distance of 2 km from the transmitter node 100 toward the optical network device 1 is expressed as "CD1=60, CD2=40". As a result, when, for example, the polarization rotation amount controlled by the transmitter node 100 is P1, the characteristics detector 16 obtains correlation values C01-C51, as depicted in FIG. 13B. C01, C11, C21, C31, C41, and C51 respectively indicate correlation values that correspond to positions at distances of 0 km, 1 km, 2 km, 3 km, 4 km, and 5 km from the transmitter node 100 toward the network device 1 when the polarization rotation amount is P1.

As described above, a correlation value corresponds to the power of an optical signal. Hence, the power of an optical signal on the transmission line in the absence of a polarization dependent loss will decrease with the transmission distance, as depicted in FIG. 13A.

In S34, the characteristics detector 16 decides whether correlation values have been calculated for all electric-field-information signals. When an electric-field-information signal for which a correlation value has not been calculated remains, the process of the characteristics detector 16 returns to S31. In particular, the characteristics detector 16 calculates correlation values for each of the polarization rotation amounts. Thus, correlation values that correspond to a plurality of positions on the transmission line are obtained for each of the polarization rotation amounts P1-P5, as depicted in FIG. 13B.

In S35, for each combination of the chromatic dispersions CD1 and CD2, the aggregation unit 23 gathers correlation values obtained by the characteristics detector 16. Thus, correlation values are gathers for a plurality of different positions on the transmission line. In the example depicted in FIGS. 13A and 13B, correlation values are gathered for positions X0-X5. For example, correlation values C11-C15 may be gathered for the position X1, and correlation values C21-C25 may be gathered for the position X2.

In S36, the PDL detector 24 calculates the difference between a largest correlation value and a smallest correlation value for a specified measurement position. For example, when the process of S36 is performed for the position X2, the PDL detector 24 extracts a largest correlation value and a smallest correlation value from the correlation values C21-C25. The PDL detector 24 calculates the difference between the extracted largest and smallest correlation values. Note that the difference between a largest correlation value and a smallest correlation value is one example of the "variation in the evaluation value corresponding to a power of the optical signal".

If a polarization dependent loss has occurred on the transmission side of the position X2, the power of an optical signal detected at the position X2 may be decreased depending on the angle of polarization of the optical signal. Thus, when the polarization of an optical signal is rotated in the transmitter node 100, the power of the optical signal detected at the position X2 will exhibit a large variation. Here, the correlation values C21-C25 correspond to powers of an optical signal detected at the position X2. Hence, when the correlation values C21-C25 exhibit large variations, a polarization dependent loss is inferred to have occurred on the transmission side of the position X2. Accordingly, when the difference between the largest and smallest of the correlation values C21-C25 is large, a polarization dependent loss is inferred to have occurred on the transmission side of the position X2.

In S37, the PDL detector 24 compares a difference calculated in S36 for a certain measurement position (hereinafter, a "target position") with a difference calculated for a measurement position adjacent to, and located on the transmission side of, the target position (hereinafter, an "adjacent position). When the difference calculated for the target position is larger than that calculated for the adjacent position, the PDL detector 24 determines that a polarization dependent loss has occurred between the adjacent position and the target position. In this case, the process of the PDL detector 24 shifts to S38. When the difference calculated for the target position is smaller than or equal to that calculated for the adjacent position, the PDL detector 24 determines that a polarization dependent loss has not occurred between the adjacent position and the target position. In this case, the process of the PDL detector 24 returns to S36.

In S38, the PDL detector 24 decides whether the difference for the target position is greater than a specified threshold. When the difference for the target position is less than or equal to the threshold, the PDL detector 24 determines that the polarization dependent loss that has occurred between the adjacent position and the target position is sufficiently small. Alternatively, it may be inferred that the difference for the target position has become larger than that for the adjacent position due to noise, an error, or the like. In this case, the process of the PDL detector 24 returns to S36. When the difference for the target position is greater than the threshold, it is determined that a polarization dependent loss has occurred between the adjacent position and the target position.

In S39, the position detector 25 generates information indicating the position for which it has been determined that a polarization dependent loss has occurred. In particular, the combination of the chromatic dispersions CD1 and CD2 is converted into the distance from the transmitter node 100 or the optical network device 1 to the target position.

S40 is provided to perform S36-S39 for all measurement positions. When the processes of S36-S39 have been finished for all measurement positions, the optical network device 1 outputs a result of process in S41. In particular, information indicating a position at which a polarization dependent loss has occurred is output.

Figure 14A:
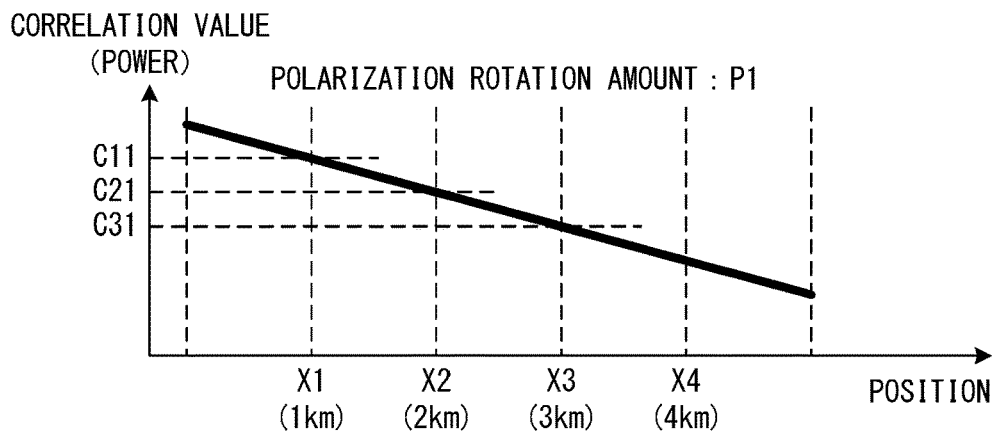
FIGS. 14A-14C illustrate an example of a method for detecting a position at which a polarization dependent loss has occurred.
Figure 14B:
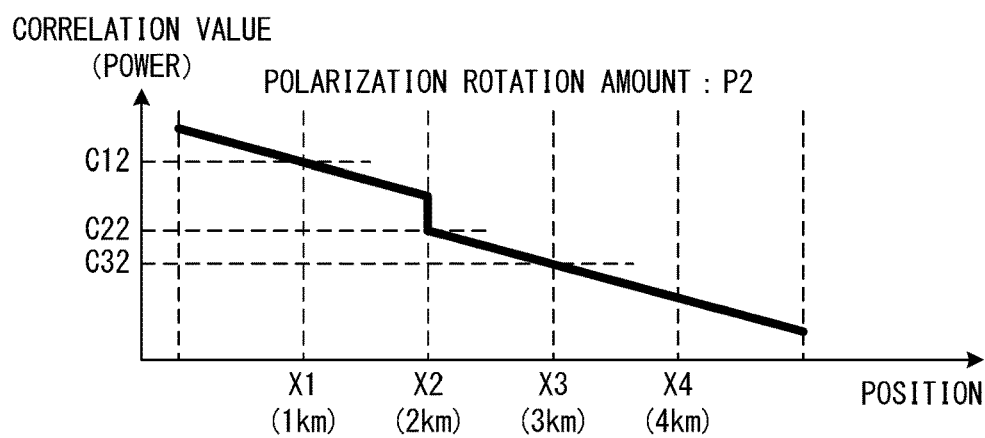
Figure 14C:
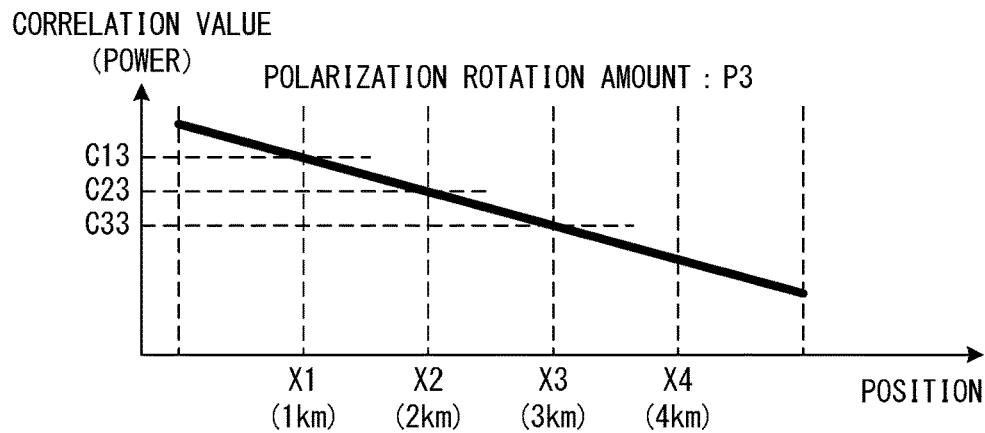

FIGS. 14A-14C illustrate an example of a method for detecting a position at which a polarization dependent loss has occurred. In this example, P1, P2, or P3 is a polarization rotation amount controlled in the transmitter node 100. FIG. 14A indicates powers calculated for positions X1-X3 when the polarization rotation amount is P1 (correlation values C11-C31). Similarly, FIG. 14B indicates powers calculated for the positions X1-X3 when the polarization rotation amount is P2 (correlation values C12-C32). FIG. 14C indicates powers calculated for the positions X1-X3 when the polarization rotation amount is P3 (correlation values C13-C33). The PDL detector 24 decides whether a polarization dependent loss has occurred by using correlation values calculated for each of the measurement positions (X1-X3 in this example).

With respect to the position X1, the correlation values C11, C12, and C13 are respectively obtained for the polarization rotation amounts P1, P2, and P3. In this example, the correlation values C11, C12, and C13 are substantially equal. In this case, since the difference between the largest correlation value and the smallest correlation value is substantially zero or very small, the decision in S38 is "No". Thus, it is determined that a polarization dependent loss has not occurred.

With respect to the position X2, the correlation values C21, C22, and C23 are respectively obtained for the polarization rotation amounts P1, P2, and P3. In this example, the correlation values C21 and C23 are substantially equal, but the correlation value C22 is smaller than the others. The difference between the largest correlation value and the smallest correlation value obtained for the position X2 is larger than the difference between the largest correlation value and the smallest correlation value obtained for the position X1. Hence, the difference obtained for the position X2 is larger than a difference obtained for a measurement position adjacent to, and located on the transmission side of, the position X2. Thus, the decision in S37 is "Yes". Assume that the difference obtained for the position X2 is greater than the threshold in S38. As a result, it is determined that a polarization dependent loss has occurred between the positions X1 and X2.

With respect to the position X3, the correlation values C31, C32, and C33 are respectively obtained for the polarization rotation amounts P1, P2, and P3. In this example, the correlation values C31 and C33 are substantially equal, but the correlation value C32 is smaller than the others. Assume that the difference between the largest correlation value and the smallest correlation value obtained for the position X3 is greater than the threshold in S38. In this case, it is inferred that a polarization dependent loss has occurred on the transmission side of the position X3. However, the difference between the largest correlation value and the smallest correlation value obtained for the position X3 is substantially the same as the difference between the largest correlation value and the smallest correlation value obtained for the position X2. Thus, the decision in S37 is "No". In this case, the PDL detector 24 infers that a polarization dependent loss has occurred on the transmission side of the position X2, not between the positions X2 and X3.

FIG. 15 illustrates another example of a method for detecting a position at which a polarization dependent loss has occurred. Also in this example, the transmitter node 100 and the optical network device 1 are connected by an optical fiber having a length of 5 km, as depicted in FIG. 13A. Results of measurement depicted in FIG. 15 are obtained. The values in FIG. 15 indicate correlation values obtained for combinations of positions and polarization rotation amounts (or indicate optical powers calculated from the correlation values). The values indicated in FIG. 15 may hereinafter be each referred to as an "evaluation value". The "difference" in FIG. 15 indicates differences between largest values and smallest values each calculated for each measurement position.

For the position X0, the largest evaluation value and the smallest evaluation value are respectively "81" and "80", and the difference is "1". For the position X1, the largest evaluation value and the smallest evaluation value are respectively "71" and "69", and the difference is "2". Hence, the difference obtained for the position X1 is larger than the difference obtained for the position X0 (S37: Yes). However, in this example, the threshold in S38 is "5". Thus, the difference obtained for the position X1 is less than the threshold (S38: No). Accordingly, the PDL detector 24 determines that a polarization dependent loss has not occurred on the transmission side of the position X1.

For the position X2, the largest evaluation value and the smallest evaluation value are respectively "60" and "50", and the difference is "10". Hence, the difference obtained for the position X2 is larger than the difference obtained for the position X1 (S37: Yes). The difference obtained for the position X2 is greater than the threshold (S38: Yes). Accordingly, the PDL detector 24 determines that a polarization dependent loss has occurred between the positions X1 and X2.

For the position X3, the largest evaluation value and the smallest evaluation value are respectively "50" and "40", and the difference is "10". Thus, the difference obtained for the position X3 is greater than the threshold (S38: Yes). In this case, it is considered that a polarization dependent loss has occurred on the transmission side of the position X3. However, the difference obtained for the position X3 is the same as the difference obtained for the position X2 (S37: No). In this case, it is determined that a polarization dependent loss has not occurred between the positions X2 and X3. In particular, it is determined that a polarization dependent loss has occurred on the transmission side of the position X2. Results of decisions obtained for the positions X4 and X5 will be similar to that for the position X3.

As described above, the optical network device 1 can detect a position at which a polarization dependent loss has occurred by analyzing electric field information of a received optical signal. Hence, effort and/or time needed to detect a position at which a polarization dependent loss has occurred can be reduced. In addition, polarization information indicating the state of a polarization is added to an optical signal for carrying a main signal, so that a position at which a polarization dependent loss has occurred can be detected even while communication services are in operation.

The flowchart depicted in FIG. 12 is an example, and the present invention is not limited to this procedure. For example, the PDL detector 24 may perform the process of S38 prior to the process of S37. Although a polarization dependent loss is detected according to the difference between a largest correlation value and a smallest correlation value in the flowchart depicted in FIG. 12, the polarization dependent loss may be detected according to the ratio between the largest correlation value and the smallest correlation value. Note that the ratio between the largest correlation value and the smallest correlation value is one example of the "variation in the evaluation value corresponding to a power of the optical signal".

For example, the digital signal processor 13, the characteristics detector 16, the polarization information extractor 21, the reception controller 22, the aggregation unit 23, the PDL detector 24, and the position detector 25 may be implemented by one or more processors. In this case, a program describing the functions of the digital signal processor 13, the characteristics detector 16, the polarization information extractor 21, the reception controller 22, the aggregation unit 23, the PDL detector 24, and the position detector 25 is stored in a memory (not illustrated). A processor executes the program to provide the functions of the digital signal processor 13, the characteristics detector 16, the polarization information extractor 21, the reception controller 22, the aggregation unit 23, the PDL detector 24, and the position detector 25. Alternatively, these functions may be implemented by a hardware circuit.

In addition, although measurement of optical powers and detection of polarization dependent losses are performed using electric-field-information signals tapped on the input side of the digital signal processor 13 in the example depicted in FIG. 5, the invention is not limited to this configuration. For example, the optical network device 1 may perform measurement of an optical power and detection of a polarization dependent loss by using output signals of the fixed equalizer 13a and the adaptive equalizer 13b depicted in FIG. 2. In this case, the fixed equalizer 13a compensates for a chromatic dispersion of the transmission line, and the adaptive equalizer 13b implements polarization separation. Accordingly, a X polarization component and a Y polarization component with the chromatic dispersion having been compensated for are acquired.

However, measurement of an optical power and detection of a polarization dependent loss are performed using an electric-field-information signal for a received optical signal that has not been compensated for a chromatic dispersion. Accordingly, the optical network device 1 adds the chromatic dispersion of the transmission line to each of the X polarization component and the Y polarization component output from the adaptive equalizer 13b. The chromatic dispersion of the transmission line is dependent on the characteristics and length of the optical fiber and thus substantially known.

The optical network device 1 calculates the above-described correlation value for each of the X polarization component and Y polarization component to which the chromatic dispersion of the transmission line has been added. Then, measurement of optical powers and detection of polarization dependent losses are performed using the obtained correlation values. In this method, a polarization dependent loss is detected for each of the X polarization and the Y polarization so that a position at which a polarization dependent loss has occurred can be accurately detected.

First Variation

In the example depicted in FIGS. 5 and 7C, a main signal is stored in a frame and transmitted, and polarization information is inserted into the header of the frame. By contrast, in the first variation, polarization information is transmitted by means of amplitude modulation. In particular, polarization information is superimposed onto an optical signal by means of amplitude modulation so as to be transmitted from the transmitter node 100 to the optical network device 1.

Figure 16A:
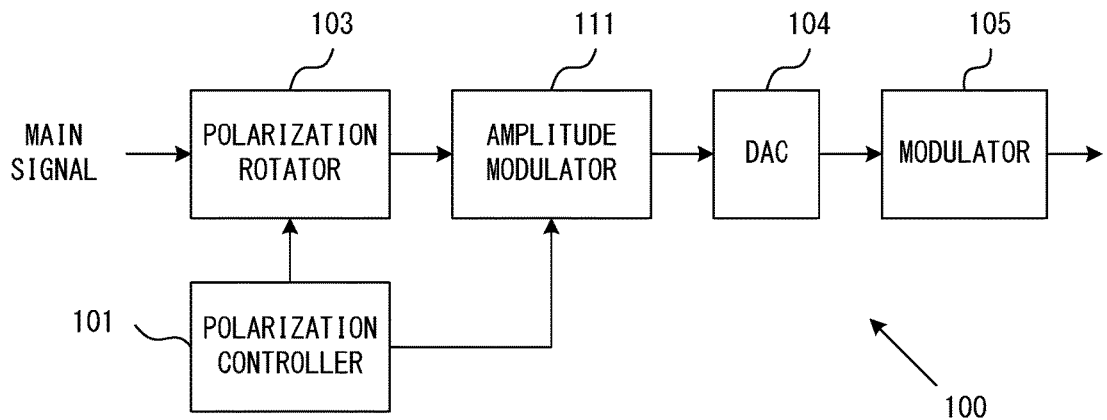
FIGS. 16A and 16B illustrate an example of a configuration in accordance with a first variation.

The transmitter node 100 includes an amplitude modulator 111 depicted in FIG. 16A, in place of the polarization information adder 102 depicted in FIG. 5. The amplitude modulator 111 changes the amplitude of electric field information indicating a main signal in accordance with the value of polarization information.

Figure 16B:
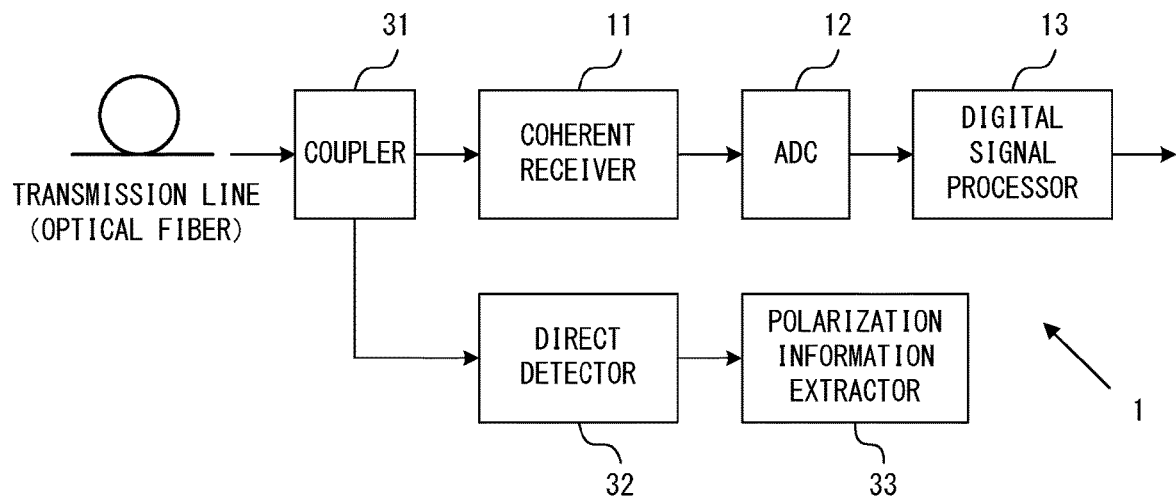

The optical network device 1 includes a coupler 31, direct detector 32, and polarization information extractor 33 depicted in FIG. 16B, in place of the polarization information extractor 21 depicted in FIG. 5. Note that indications of functions that are not directly related to extraction of polarization information are omitted in FIG. 16B.

The coupler 31 splits and guides a received optical signal to the direct detector 32. The direct detector 32 outputs a signal indicating the amplitude or power of the received optical signal. For example, the direct detector 32 may detect received light by using a photodiode having a sufficiently low rate in comparison with the symbol rate of a main signal. The polarization information extractor 33 recovers polarization information from an output signal of the direct detector 32.

As described above, in the first variation, polarization information is transmitted by means of amplitude modulation. Hence, the transmission rate of a main signal does not need to be increased to transmit polarization information. Accordingly, in the first variation, polarization information can be transmitted from a transmitter node to a receiver node without changing the transmission rate of a main signal.

Second Variation

In the first variation, polarization information is transmitted by means of amplitude modulation. By contrast, in the second variation, polarization information is transmitted by means of frequency modulation. In particular, polarization information is superimposed onto an optical signal by means of frequency modulation and transmitted from the transmitter node 100 to the optical network device 1.

Figure 17A:
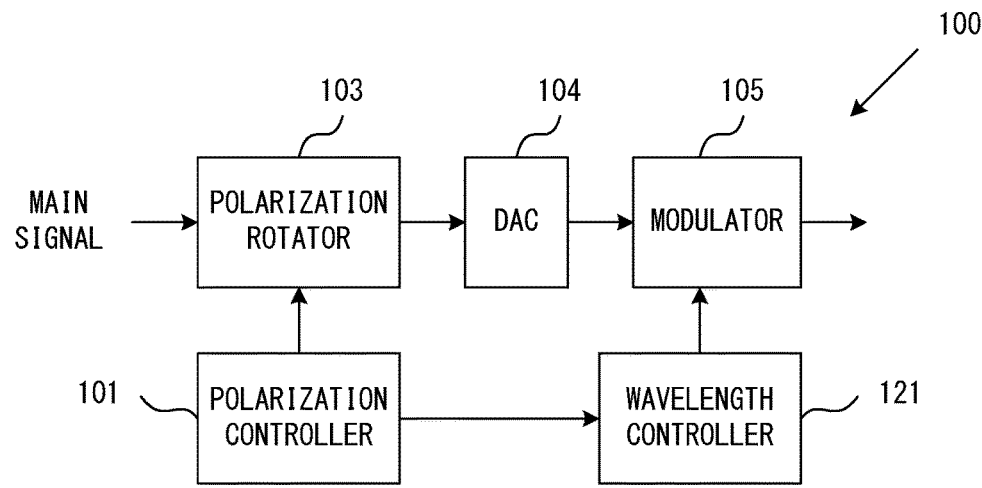
FIGS. 17A-17C illustrate examples of a configuration and an operation in accordance with a second variation.
Figure 17B:
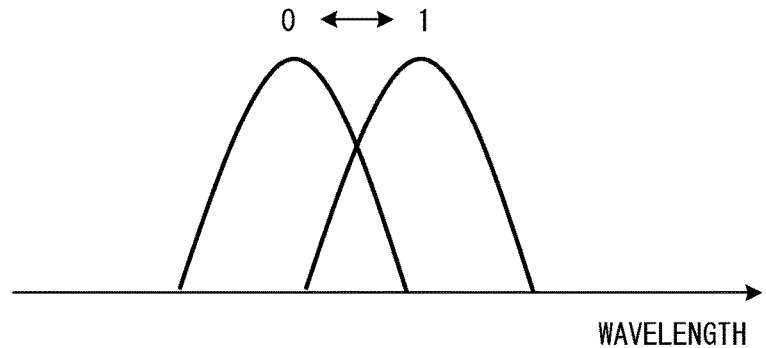

The transmitter node 100 includes a wavelength controller 121 depicted in FIG. 17A, in place of the polarization information adder 102 depicted in FIG. 5. The wavelength controller 121 controls the oscillation wavelength of a laser light source provided at the modulator 104 in accordance with the value of polarization information. As an example, the oscillation wavelength of the laser light source may be controlled such that the wavelength attained when the value of polarization information is "1" is longer than the wavelength attained when the value of polarization information is "0", as depicted in FIG. 17B. Owing to the wavelength control, frequency modulation for transmitting polarization information is implemented.

Figure 17C:
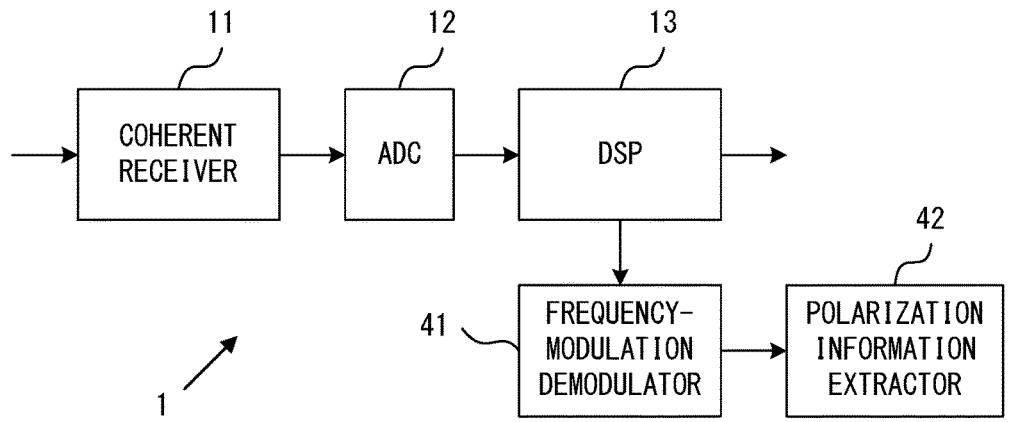

The optical network device 1 includes a frequency-modulation demodulator 41 and polarization information extractor 42 depicted in FIG. 17C, in place of the polarization information extractor 21 depicted in FIG. 5. Note that indications of functions that are not directly related to extraction of polarization information are omitted in FIG. 17C.

The frequency-modulation demodulator 41 detects a change in the wavelength of a received signal by using an output signal of the fixed equalizer 13a depicted in FIG. 2. Thus, a frequency-modulated signal is demodulated. Circuits for demodulating a frequency-modulated signal are publicly known and described by, for example, Z. Tao, H. Zhang, A. Isomura, L. Li, T. Hoshida and J. C. Rasmussen, "Simple, Robust, and Wide-Range Frequency Offset Monitor for Automatic Frequency Control in Digital Coherent Receivers," Optical Communication (ECOC), 2007 33rd European Conference and Exhibition of, Berlin, Germany, 2007, pp. 1-2.

As described above, in the second variation, polarization information is transmitted by means of frequency modulation. Hence, the transmission rate of a main signal does not need to be increased to transmit polarization information. Accordingly, in the second variation, polarization information can be transmitted from a transmitter node to a receiver node without changing the transmission rate of a main signal.

Third Variation

Figure 18A:
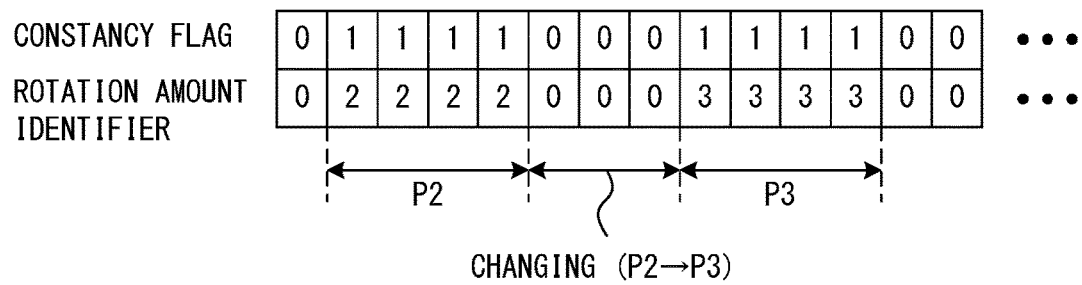
FIGS. 18A and 18B illustrate examples of polarization information used in a third variation.

In the third variation, polarization information includes a constancy flag and a rotation amount identifier, as depicted in FIG. 18A. For example, the constancy flag is the same as the polarization information depicted in FIG. 7A. Thus, the constancy flag indicates whether a polarization rotation amount controlled in the transmitter node 100 is constant. In this example, the constancy flag is "1" when the polarization rotation amount is maintained at a constant value and "0" when the polarization rotation amount is changing. However, for example, the constancy flag may be the same as the polarization information depicted in FIG. 7B.

The rotation amount identifier identifies a polarization rotation amount controlled in the transmitter node 100. For example, rotation amount identifiers "1", "2", "3" . . . may be assigned to polarization rotation amounts P1, P2, P3 . . . , respectively.

Figure 18B:
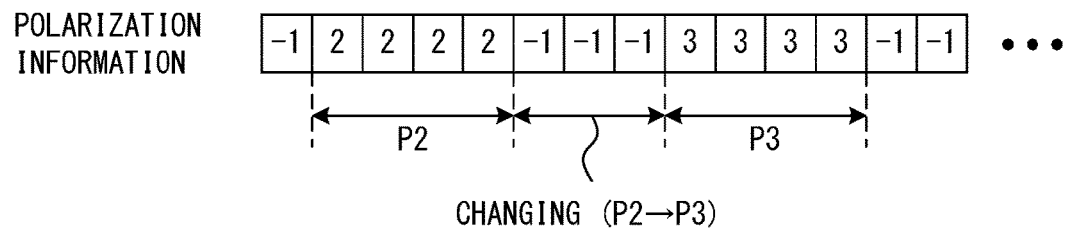

The constancy flag and the rotation amount identifier do not need to be separate from each other. For example, in the example depicted in FIG. 18B, during a period in which the polarization rotation amount is maintained at a constant value, polarization information may indicate a value identifying a polarization rotation amount; and during a period in which the polarization rotation amount is changing, polarization information may indicate a value that corresponds to a state in which the polarization rotation amount is not constant (e.g., "−1").

Figure 19:
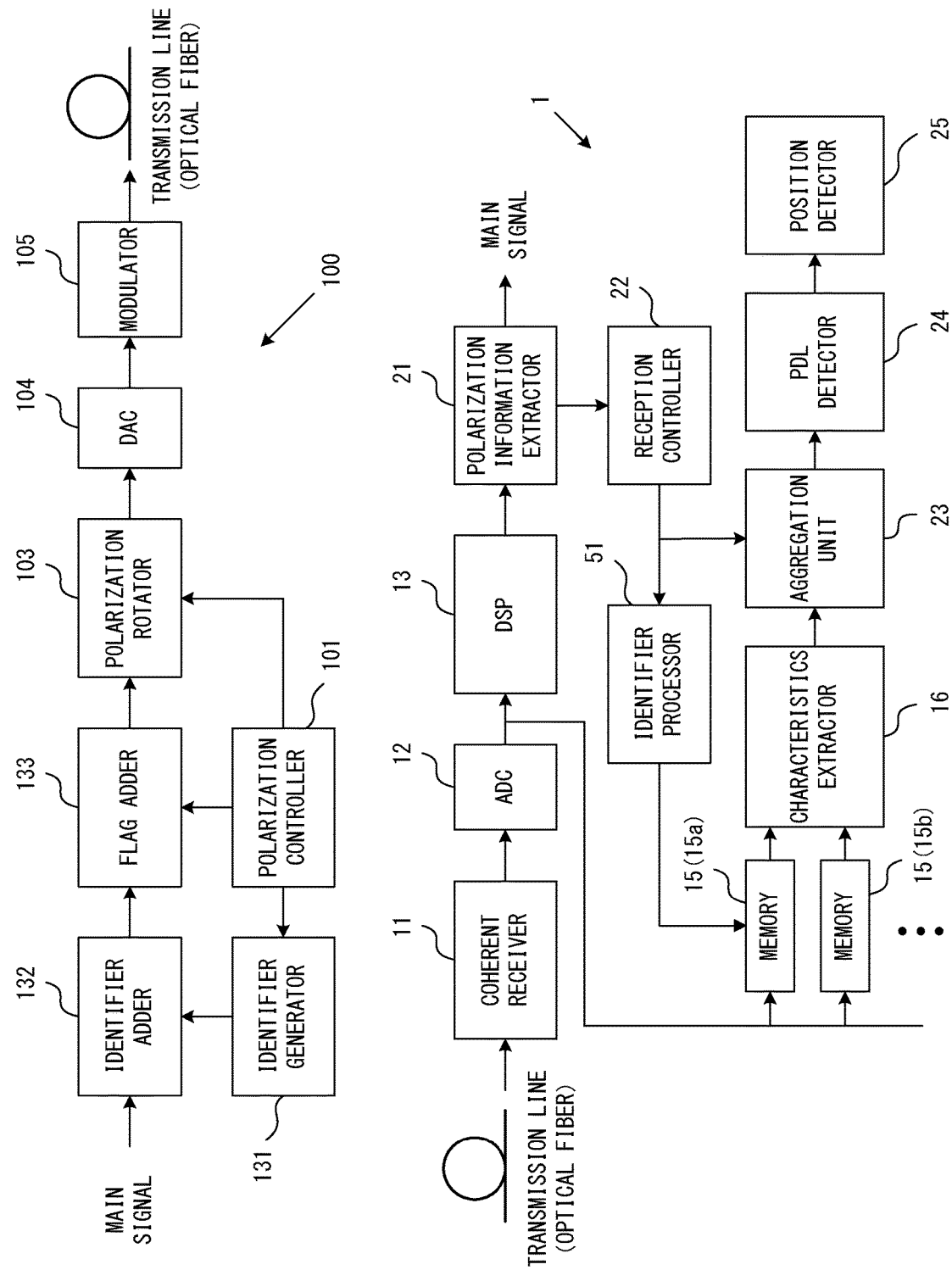
FIG. 19 illustrates an example of a configuration in accordance with a third variation.

FIG. 19 illustrates the third variation of the optical network system. In the third variation, the transmitter node 100 includes an identifier generator 131, an identifier adder 132, and a flag adder 133. The polarization controller 101, the polarization rotator 103, the DAC 104, and the modulator 105 in FIG. 19 are substantially the same as those in FIG. 5.

The identifier generator 131 generates a rotation amount identifier for identifying a polarization rotation amount in accordance with settings made for the polarization rotation amount by the polarization controller 101. The identifier adder 132 inserts a rotation amount identifier into the header of a frame for carrying a main signal. In accordance with settings made for the polarization rotation amount by the polarization controller 101, the flag adder 133 inserts, into the header of the frame, a constancy flag indicating whether the polarization rotation amount has been maintained at a constant value.

The optical network device 1 includes an identifier processor 51 in addition to the components depicted in FIG. 5. For each rotation amount identifier, the identifier processor 51 controls a storing process performed by the memory circuit 15. For example, the memory circuit 15 may associate electric field information indicating the electric field of a received optical signal with a rotation amount identifier and store the resultant information in a memory region. That is, electric field information associated with a polarization rotation amount is stored. Accordingly, the optical network device 1 can reliably acquire electric field information corresponding to each polarization rotation amount.

Fourth Variation

In the third variation, in a case where pieces of electric field information associated with rotation amount identifiers are stored, even when a piece of electric field information corresponding to a certain polarization rotation amount is lost, the optical network device 1 can acquire this piece of electric field information in a later measurement cycle. However, the state of the transmission line may change. Hence, when a long time is needed to completely collect pieces of electric field information corresponding to the polarization rotation amounts, pieces of electric field information corresponding to different states could be included in the collected information. In this case, the reliability of a result of measurement of a polarization dependent loss will be low. Accordingly, in the fourth variation, when all pieces of electric field information are not collected within a specified time period after the storing of the initial piece of electric field information, the optical network device 1 discards the electric field information stored in the memory.

Figure 20:
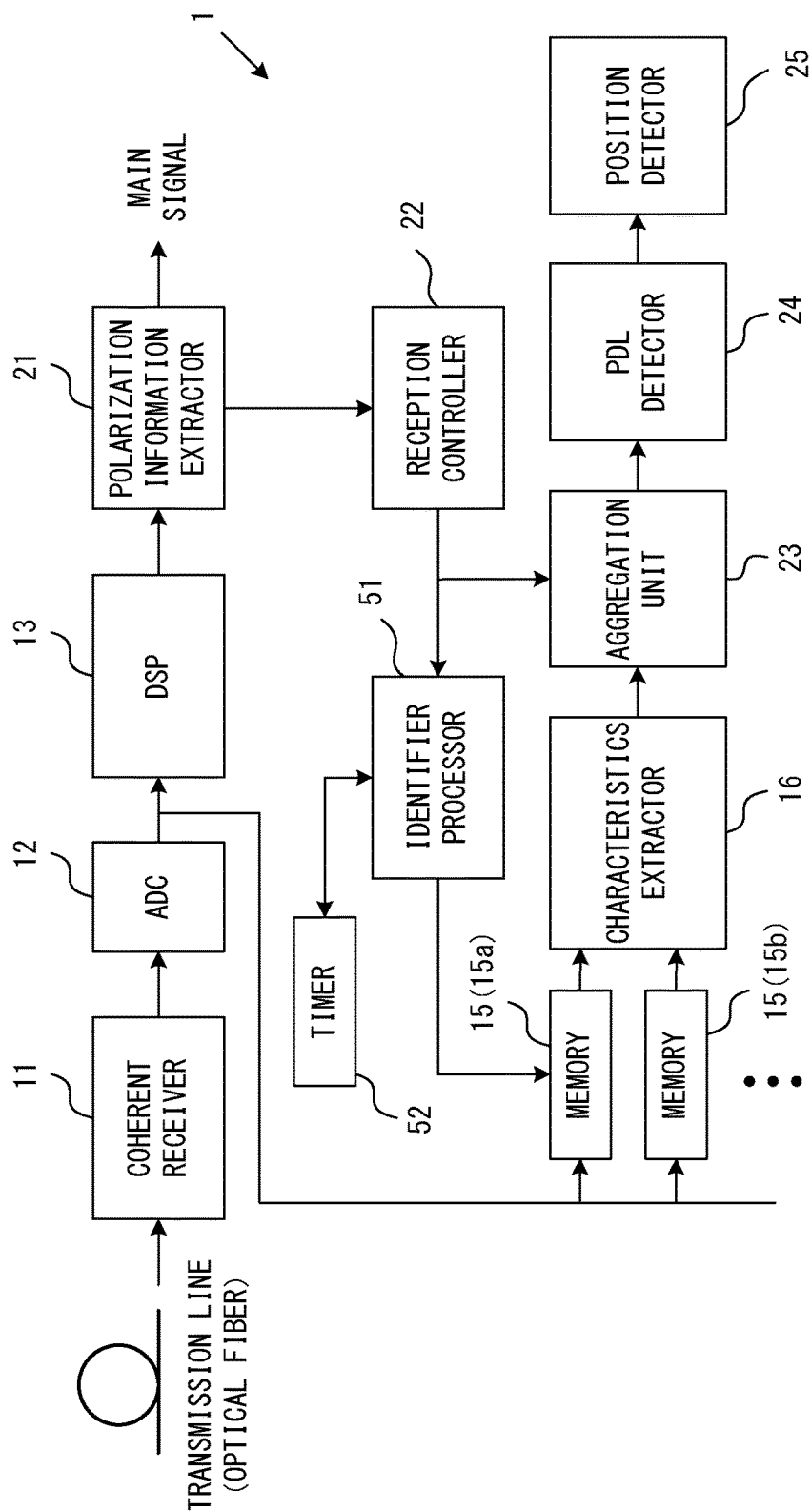
FIG. 20 illustrates an example of a configuration in accordance with a fourth variation.

FIG. 20 illustrates an example of the optical network device 1 used in the fourth variation. In the fourth variation, the optical network device 1 includes a timer 52 in addition to the components depicted in FIG. 19. The timer 52 is activated when an initial piece of electric field information is stored in the memory circuit 15. The identifier processor 51 monitors a rotation amount identifier that has been added to a main signal. When the timer 52 ends before the optical network device 1 receives all rotation amount identifiers, the identifier processor 51 gives a discarding instruction to the memory circuit 15. In response to this, the memory circuit 15 discards the electric field information stored in a memory region. In this case, the optical network device 1 starts to collect new electric field information.

As described above, in the fourth variation, when a time needed to collect electric field information exceeds a threshold, electric field information that has already been stored is discarded. Hence, the reliability of a result of measurement of a polarization dependent loss will be high.

Fifth Variation

Figure 21A:
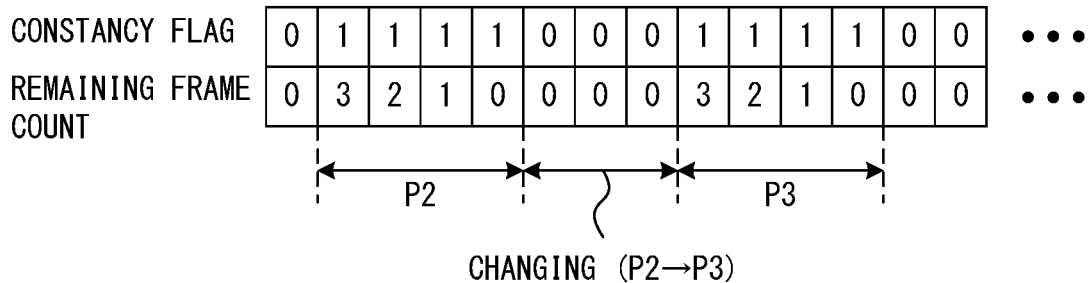
FIGS. 21A-21C illustrate examples of polarization information used in a fifth variation.

The polarization information in the fifth variation includes a constancy flag and remaining frame count information, as depicted in FIG. 21A. As in the third variation, the constancy flag indicates whether a polarization rotation amount controlled in the transmitter node 100 is constant. The remaining frame count information indicates a remaining time period in which a polarization rotation amount is to be maintained at a constant value. In the example depicted in FIG. 21A, a period in which the polarization rotation amount is maintained at a constant value is four frames. In this case, the remaining frame count information is decremented sequentially by one from 3 to zero.

Figure 21B:
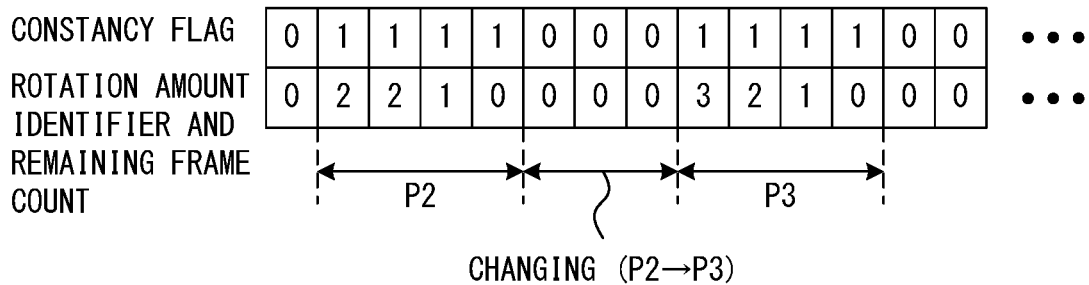

The rotation amount identifier in the third variation and the remaining frame count information may be combined. In this case, a rotation amount identifier is inserted into a leading frame during a period in which the polarization rotation amount is maintained at a constant value, and remaining frame count information is inserted into each of the subsequent frames. In the example depicted in FIG. 21B, during a period in which the polarization rotation amount is maintained at P2, 2 is inserted into the leading frame as a rotation amount identifier, and 2, 1, and 0 are sequentially inserted into the following frames as remaining frame count information. During a period in which the polarization rotation amount is maintained at P3, 3 is inserted into the leading frame as a rotation amount identifier, and 2, 1, and 0 are sequentially inserted into the following frames as remaining frame count information.

Figure 21C:
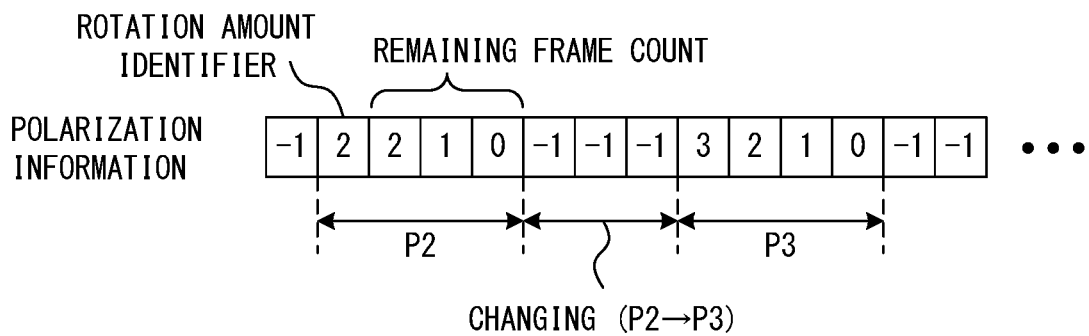

The constancy flag, rotation amount identifier, and remaining frame count information do not need to be separate from each other. For example, in the example depicted in FIG. 21C, during a period in which the polarization rotation amount is maintained at a constant value, polarization information may indicate a rotation amount identifier and remaining frame count information; and during a period in which the polarization rotation amount is changing, polarization information may indicate a value that corresponds to a state in which the polarization rotation amount is not constant (e.g., "−1").

Figure 22:
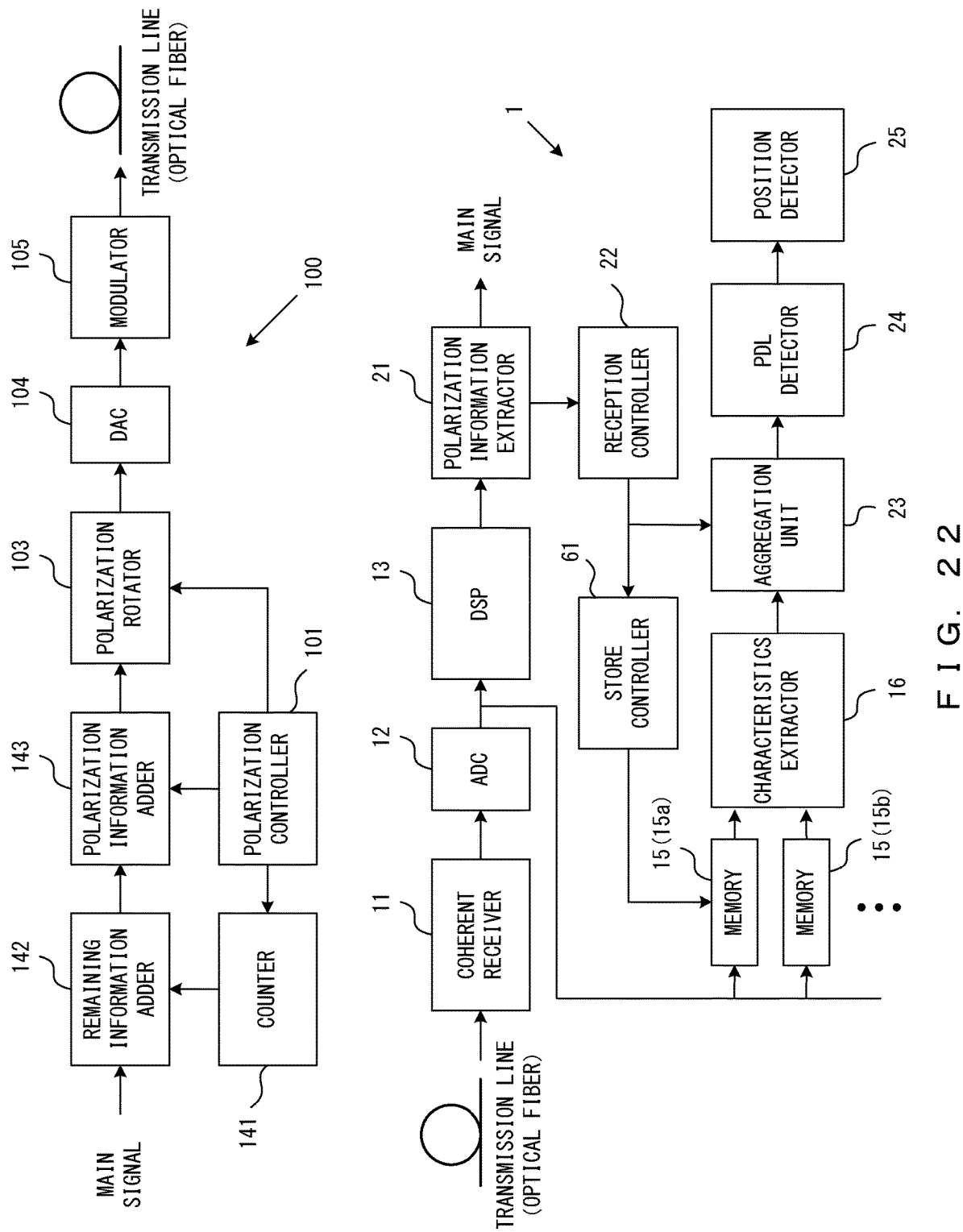
FIG. 22 illustrates an example of a configuration in accordance with a fifth variation.

FIG. 22 illustrates the fifth variation of the optical network system in accordance with embodiments of the present invention. In the fifth variation, the transmitter node 100 includes a counter 141, a remaining information adder 142, and a polarization information adder 143. The polarization rotator 103, the DAC 104, and the modulator 105 in FIG. 22 are substantially the same as those in FIG. 5.

The polarization controller 101 sets a polarization rotation amount, as depicted in FIG. 6. The counter 141 is activated at the start timing of a period in which the polarization rotation amount is maintained at a constant value. In this example, the initial value of the counter 141 indicates the period in which the polarization rotation amount is maintained at a constant value. The counter 141 is decremented at a frame transmission cycle. Accordingly, the count value of the counter 141 indicates a remaining time period in which the polarization rotation amount is to be maintained at a constant value (i.e., remaining frame count).

The remaining information adder 142 inserts the count value of the counter 141 into the header of a frame. Thus, the remaining frame count is added to the main signal. The polarization information adder 143 inserts polarization information into the header of the frame. For example, in the example depicted in FIG. 21A, the constancy flag may be inserted into the header of a frame. In the example depicted in FIG. 21B, the constancy flag and rotation amount identifier may be inserted into the header of a frame.

The optical network device 1 includes a store controller 61, as depicted in FIG. 22. The store controller 61 controls operations of the memory circuit 15 according to the remaining frame count information within polarization information. For example, the store controller 61 may compare a necessary time for the memory circuit 15 to acquire and store electric field information in a memory region with a remaining time indicated by remaining frame count information. When the remaining time is longer than the necessary time, the memory circuit 15 acquires and stores the electric field information in the memory region. Assume as an example that a period in which the polarization rotation amount is maintained at a constant value is four frames and a necessary time for the memory circuit 15 to acquire and store electric field information in the memory region is two frames. In this case, when the remaining frame count is 2 or larger, the memory circuit 15 starts the storing process, and when the remaining frame count is smaller than 2, the memory circuit 15 does not start the storing process.

Sixth Variation

Figure 23:
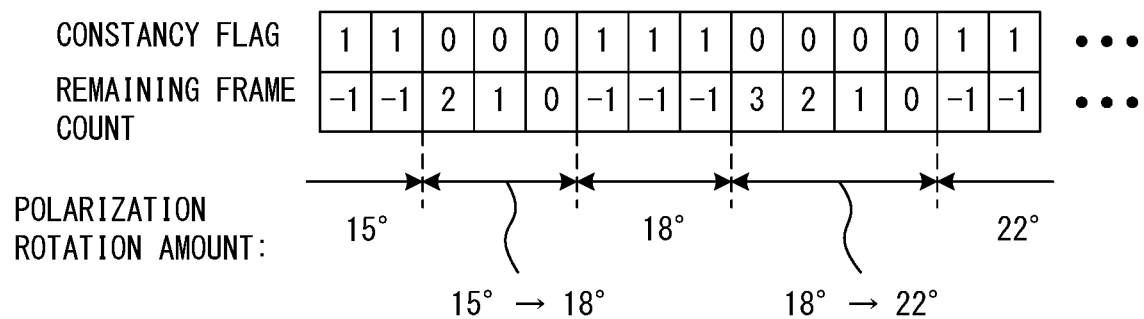
FIG. 23 illustrates an example of polarization information used in a sixth variation.

Speed-enhancement of the process of adaptively equalizing received signals in the optical network 1 is limited. Accordingly, the polarization controller 101 slowly changes a polarization rotation amount when the polarization rotation amount is changed from a certain constant value to a next constant value in the transmitter node 100. For example, in the example depicted in FIG. 23, the polarization controller 101 may change the polarization rotation amount only one degree within a period of time assigned to one frame. The transmitter node 100 reports a time needed to change the polarization rotation amount from the certain constant value to the next constant value to the receiver node (i.e., optical network device 1).

Accordingly, the polarization information in the sixth variation includes a constancy flag and remaining frame count information. As in the third and fifth variations, the constancy flag indicates whether a polarization rotation amount controlled in the transmitter node 100 is constant. The remaining frame count information indicates a period of remaining time needed to change the polarization rotation amount from a certain constant value to a next constant value, unlike in the fifth variation. In the example depicted in FIG. 23, the polarization rotation amount changes from 15 degrees to 18 degrees in a period of three frames. In this case, the remaining frame count information is decremented sequentially by one from 2 to zero. In the meantime, the polarization rotation amount changes from 18 degrees to 22 degrees in a period of four frames. In this case, the remaining frame count information is decremented sequentially by one from 3 to zero.

The configuration of the transmitter node 100 in the sixth variation is substantially the same as that in the fifth variation depicted in FIG. 22. However, the counter 141 is activated at the end timing of a period in which the polarization rotation amount is maintained at a constant value. The initial value of the counter 141 indicates a period of necessary time for the polarization rotation amount to change from the current constant value to a next constant value. The counter 141 is decremented at a frame transmission cycle. Accordingly, the count value of the counter 141 indicates a remaining time period in which the polarization rotation amount will be changing (i.e., remaining frame count). The remaining information adder 142 inserts the count value of the counter 141 into the header of a frame. Thus, the remaining frame count is added to the main signal.

The configuration of the optical network device 1 in the sixth variation is substantially the same as that in the fifth variation depicted in FIG. 22. However, the store controller 61 controls operations of the memory circuit 15 according to the remaining frame count information within polarization information. In this example, according to frame count information, the store controller 61 determines a preferable timing at which the memory circuit 15 is to start storing of next electric field information. Then, the store controller 61 gives the memory circuit 15 an instruction indicating a store start timing. In accordance with this instruction, the memory circuit 15 stores electric field information in a corresponding memory region.

For example, the processes in the first to sixth variations may be implemented by one or more processors. In particular, in the transmitter node 100, a processor may execute a program to implement the functions of the amplitude modulator 111, the wavelength controller 121, the identifier generator 131, the identifier adder 132, the flag adder 133, the remaining information adder 142, and the polarization information adder 143. In the optical network device 1, a processor may execute a program to implement the functions of the polarization information extractor 33, the frequency-modulation demodulator 41, the polarization information extractor 42, the identifier processor 51, and the store controller 61.

Seventh Variation

In a case where a polarization rotation amount is changed step by step, when the step from a certain constant value to a next constant value is large, the measurement time will be short, but the accuracy in detection of a polarization dependent loss will be decreased. When the step from a certain constant value to a next constant value is small, the accuracy in detection of a polarization dependent loss will be high, but the measurement time will be long. Accordingly, in the seventh variation, the initial value of a polarization rotation amount is shifted for each measurement cycle.

Figures 24A, 24B:
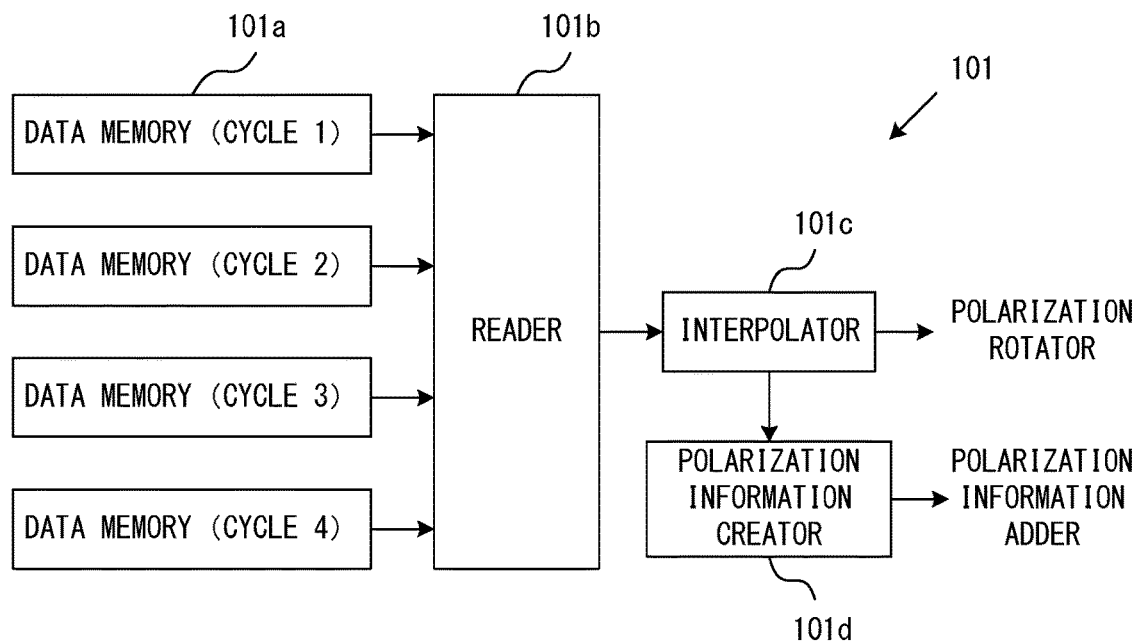
FIGS. 24A and 24B illustrate an example of an operation in accordance with a seventh variation.

In the example depicted in FIG. 24A, the polarization rotation amount may be maintained during each step of 10 degrees from 10 degrees to 90 degrees in the first measurement cycle, and the polarization rotation amount may be maintained during each step of 10 degrees from 15 degrees to 95 degrees in the second measurement cycle. After the four measurement cycles are finished, these measurement cycles are repeatedly performed as necessary.

In the example depicted in FIG. 24A, there is a large difference between the last polarization rotation amount in the first measurement cycle (i.e., 90 degrees) and the initial polarization rotation amount in the second measurement cycle (i.e., 15 degrees). Thus, in the second measurement cycle, the polarization rotation amount may be decremented at step of 10 degrees from 95 degrees to 15 degrees. Similarly, in the fourth measurement cycle, the polarization rotation amount may be decremented at step of 10 degrees from 87 degrees to 7 degrees.

The polarization controller 101 in the seventh variation includes a data memory 101*a*, a reader 101*b*, an interpolator 101*c*, and a polarization information creator 101*d*, as depicted in FIG. 24B. The data memory 101*a* stores data indicating a polarization rotation amount for each measurement cycle. Note that FIG. 24A depicts an example of the data stored in the data memory 101*a*. The reader 101*b* reads data indicating a polarization rotation amount from the data memory 101*a*. The interpolator 101*c* calculates an actual polarization rotation amount from data read from the reader 101*b*. For example, during a period in which the polarization rotation amount is changing from 10 degrees to 20 degrees in the first measurement cycle, the interpolator 101*c* may generate a value incremented sequentially by one degree from 10 degrees to 20 degrees and output this value to the polarization rotator 103. The polarization information creator 101*d* creates polarization information indicating whether the polarization rotation amount is maintained at a constant value. For example, in the configuration depicted in FIG. 5, the polarization information may be supplied to the polarization information adder 102.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical network device that receives an optical signal via a transmission line, the optical signal being transmitted from a transmitter node, polarization information that indicates a polarization state having been added to the optical signal, the optical network device comprising:
   a receiver configured to generate electric-field-information signal that indicates an electric field of the optical signal; and
   a processor configured to
      acquire, when a polarization rotation amount of the optical signal is controlled in the transmitter node, for each of the polarization rotation amounts of the optical signal, the electric-field-information signal during a period specified by the polarization information,
      calculate, for each of the polarization rotation amounts of the optical signal and based on the electric-field-information signal, evaluation values corresponding to powers of the optical signal at a plurality of positions on the transmission line,
      calculate, for each of the plurality of positions, variations in the evaluation values corresponding to the polarization rotation amounts of the optical signal, and
      output information that indicates a first position among the plurality of positions when the variation in the evaluation values for the first position is larger than the variation in the evaluation values for a second position among the plurality of positions, the second position being adjacent to the first position and being located on a side where the transmitter node is provided with respect to the first position.

2. The optical network device according to claim 1, wherein
   the processor outputs the information indicating the first position when the variation in the evaluation values for the first position is larger than the variation in the evaluation values for the second position and is greater than a specified threshold.

3. The optical network device according to claim 1, wherein
   the polarization information includes information indicating whether a polarization of the optical signal is maintained in a constant state in the transmitter node, and
   the processor acquires the electric-field-information signal when the polarization of the optical signal is maintained in a constant state in the transmitter node.

4. The optical network device according to claim 1, wherein
   the processor
      compensates for a first chromatic dispersion in a chromatic dispersion of the transmission line in the electric-field-information signal so as to generate a first compensated signal,
      compensates for a nonlinear distortion of the transmission line in the first compensated signal so as to generate a second compensated signal,
      compensates for a remaining chromatic dispersion in the chromatic dispersion of the transmission line in the second compensated signal so as to generate a third compensated signal,
      calculates an evaluation value corresponding to a combination of the first chromatic dispersion and the remaining chromatic dispersion according to the third compensated signal, and calculates evaluation values for the plurality of positions on the transmission line by calculating the evaluation values while changing an amount of the first chromatic dispersion.

5. The optical network device according to claim 4, wherein the evaluation value indicates a correlation between a signal indicating the optical signal in the transmitter node and the third compensated signal.

6. A transmission-line monitoring method for monitoring a transmission line between a transmitter node and an optical network device that receives an optical signal transmitted from the transmitter node, wherein the transmitter node adds polarization information to the optical signal while changing the polarization state of the optical signal in a plurality of different states, the polarization information indicating the polarization state of the optical signal, the optical network device acquires, for each of the polarization states, an electric-field-information signal indicating an electric field of the optical signal during a period specified by the polarization information, calculates, for each of the polarization states and based on the electric-field-information signal, evaluation values corresponding to powers of the optical signal at a plurality of positions on the transmission line, calculates, for each of the plurality of positions, variations in evaluation values corresponding to the polarization states of the optical signals, and determines that a polarization dependent loss has occurred between a first position among the plurality of positions and a second position among the plurality of positions when the variation in the evaluation values for the first position is larger than the variation in the evaluation values for the second position, the second position being adjacent to the first position and being located on a side where the transmitter node is provided with respect to the first position.

7. The transmission-line monitoring method according to claim 6, wherein the polarization information includes information indicating whether a polarization of the optical signal is maintained in a constant state in the transmitter node, and the optical network device acquires the electric-field-information signal when the polarization of the optical signal is maintained in a constant state in the transmitter node.

8. The transmission-line monitoring method according to claim 6, wherein the optical signal carries a frame, and the polarization information is inserted into the frame.

9. The transmission-line monitoring method according to claim 6, wherein the polarization information is superimposed onto the optical signal by means of amplitude modulation.

10. The transmission-line monitoring method according to claim 6, wherein the polarization information is superimposed onto the optical signal by means of frequency modulation.

11. The transmission-line monitoring method according to claim 6, wherein the polarization information includes an identifier identifying a polarization rotation amount and a flag indicating whether a polarization of the optical signal is maintained in a constant state in the transmitter node, and when the polarization of the optical signal is maintained in a constant state in the transmitter node, the optical network device acquires the electric-field-information signal and stores the electric-field-information signal in association with the identifier.

12. The transmission-line monitoring method according to claim 11, wherein when electric-field-information signals corresponding to a plurality of identifiers specified in advance are not acquired within a specified time period, the optical network device discards electric-field-information signals that have already been stored.

13. The transmission-line monitoring method according to claim 6, wherein the polarization information includes a flag indicating whether a polarization of the optical signal is maintained in a constant state in the transmitter node and information indicating a remaining time period in which the polarization is to be maintained in the constant state, and the optical network device acquires the electric-field-information signal when the polarization of the optical signal is maintained in a constant state in the transmitter node.

14. The transmission-line monitoring method according to claim 6, wherein the polarization information includes a flag indicating whether a polarization of the optical signal is maintained in a constant state in the transmitter node and information indicating a period of remaining time to be taken to change the polarization from the constant state to a next constant state, and the optical network device acquires the electric-field-information signal when the polarization of the optical signal is maintained in a constant state in the transmitter node.

* * * * *